US012229790B2

(12) United States Patent
Sheppard et al.

(10) Patent No.: US 12,229,790 B2
(45) Date of Patent: Feb. 18, 2025

(54) ESTIMATION AND USE OF NESTED MERGE RATIOS FOR AUDIENCE MEASUREMENT

(71) Applicant: The Nielsen Company (US), LLC, New York, NY (US)

(72) Inventors: Michael Sheppard, Holland, MI (US); Marissa Joseph, Monroe Township, NJ (US); Susan Kim, Mercer Island, WA (US); Beate Sissenich, New York, NY (US)

(73) Assignee: The Nielsen Company (US), LLC, New York, NY (US)

( * ) Notice: Subject to any disclaimer, the term of this patent is extended or adjusted under 35 U.S.C. 154(b) by 172 days.

(21) Appl. No.: 18/051,294

(22) Filed: Oct. 31, 2022

(65) Prior Publication Data

US 2023/0199240 A1    Jun. 22, 2023

Related U.S. Application Data

(60) Provisional application No. 63/292,991, filed on Dec. 22, 2021.

(51) Int. Cl.
*G06Q 30/0202* (2023.01)
*G06Q 30/0201* (2023.01)
*G06Q 30/0203* (2023.01)

(52) U.S. Cl.
CPC ..... *G06Q 30/0202* (2013.01); *G06Q 30/0201* (2013.01); *G06Q 30/0203* (2013.01)

(58) Field of Classification Search
CPC .......................................... G06Q 10/00–50/00

USPC ................................................ 705/7.11–7.42
See application file for complete search history.

(56) References Cited

U.S. PATENT DOCUMENTS

| | | | | |
|---|---|---|---|---|
| 8,423,406 | B2* | 4/2013 | Briggs | G06Q 30/0202 |
| | | | | 705/14.42 |
| 9,852,163 | B2* | 12/2017 | Srivastava | G06F 16/215 |
| 2013/0145022 | A1* | 6/2013 | Srivastava | G06Q 30/0201 |
| | | | | 709/224 |

(Continued)

OTHER PUBLICATIONS

United States Patent and Trademark Office, Final Office Action, issued in connection with U.S. Appl. No. 17/408,158, dated Nov. 22, 2023, 12 pages.

(Continued)

*Primary Examiner* — Alan S Miller

(57) ABSTRACT

Methods, apparatus, systems and articles of manufacture (e.g., physical storage media) to estimate and use nested merge ratios (e.g., nested Fréchet ratios) for audience measurement are disclosed herein. Example apparatus disclosed herein are to identify a first merged media event for which a first census audience value is to be determined, the first merged media event based on a union including a second merged media event. Disclosed example apparatus are also to determine whether the first merged media event satisfies a mutual exclusivity condition. Disclosed example apparatus are further to, in response to the first merged media event satisfying the mutual exclusivity condition, estimate the first census audience value for the first merged media event based on at least a merge ratio and a second census audience value previously estimated for the second merged media event.

20 Claims, 12 Drawing Sheets

(56) References Cited

U.S. PATENT DOCUMENTS

| | | | |
|---|---|---|---|
| 2015/0046579 A1* | 2/2015 | Perez | G06F 16/23 |
| | | | 709/224 |
| 2016/0117397 A1* | 4/2016 | Bansal | G06F 16/9535 |
| | | | 707/723 |
| 2017/0034593 A1* | 2/2017 | Ray | G06Q 30/0251 |
| 2017/0053306 A1* | 2/2017 | Sissenich | G06F 16/1748 |
| 2017/0127110 A1* | 5/2017 | Chaar | H04H 60/31 |
| 2017/0155956 A1* | 6/2017 | Nagaraja Rao | H04H 60/66 |
| 2018/0137541 A1* | 5/2018 | Yelton | G06Q 30/0272 |
| 2019/0149869 A1* | 5/2019 | Ray | H04N 21/812 |
| | | | 725/35 |
| 2022/0058666 A1 | 2/2022 | Sheppard et al. | |

OTHER PUBLICATIONS

United States Patent and Trademark Office, Non-Final Office Action, issued in connection with U.S. Appl. No. 17/408,158, dated Jun. 22, 2023, 28 pages.

Theodore Hailperin, "Best possible inequalities for the probability of a logical function of events," The American Mathematical Monthly, vol. 72, No. 4 (Apr. 1965), pp. 343-359, 18 pages, retrieved from 137.149.200.5 on Aug. 28, 2015.

Wikipedia, "Fréchet inequalities," retrieved from <https://en.wikipedia.org/w/index.php?title=Fréchet_inequalities&oldid=1100454928> on Oct. 27, 2022, 6 pages.

* cited by examiner

US 12,229,790 B2

ESTIMATION AND USE OF NESTED MERGE RATIOS FOR AUDIENCE MEASUREMENT

RELATED APPLICATION(S)

This patent claims the benefit of and priority to U.S. Provisional Application No. 63/292,991, titled "NESTED FRECHET RATIO" and filed Dec. 22, 2021. U.S. Provisional Application No. 63/292,991 is hereby incorporated by reference in its entirety.

FIELD OF THE DISCLOSURE

This disclosure relates generally to audience measurement and, more particularly, to estimation and use of nested merge ratios (e.g., nested Fréchet ratios) for audience measurement.

BACKGROUND

Determining a size and demographics of an audience of a media presentation helps media providers and distributors schedule programming and determine a price for advertising presented during the programming. Also, accurate estimates of audience demographics enable advertisers to target advertisements to certain types and sizes of audiences. To collect these demographics, an audience measurement entity may enlist a group of media consumers (often called panelists) to cooperate in an audience measurement study (often called a panel) for a predefined length of time. In some examples, the audience measurement entity obtains (e.g., directly, or indirectly from a media service provider) return path data (e.g., census data representative of a population of users) from media presentation devices (e.g., set-top boxes) that identifies tuning data from the media presentation device. In some examples, the media consumption habits and demographic data associated with the enlisted media consumers are collected and used to statistically determine the size and demographics of the entire audience of the media presentation. In some examples, this collected data (e.g., data collected via measurement devices) may be supplemented with survey information, for example, recorded manually by the presentation audience members.

Figure 1:
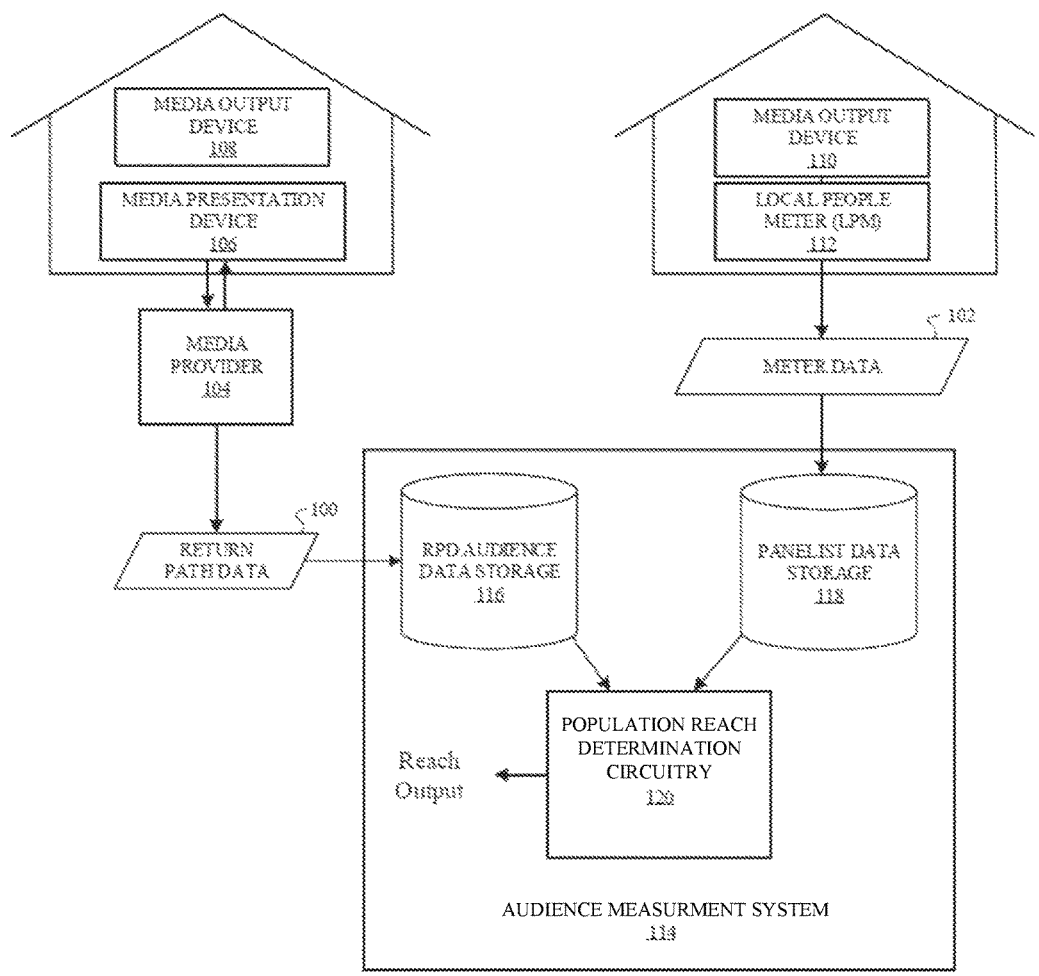
FIG. 1 is a block diagram of an example audience measurement environment including example population reach determination circuitry to estimate and use merge ratios for audience measurement in accordance with teachings of this disclosure.

The figures are not to scale. In general, the same reference numbers will be used throughout the drawing(s) and accompanying written description to refer to the same or like parts, elements, etc. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Audience measurement entities seek to understand the composition and size of audiences of media, such as television programming. Such information allows audience measurement entity researchers to, for example, report advertising delivery and/or targeting statistics to advertisers that target their media (e.g., advertisements) to particular audiences. Also, such information helps to establish advertising prices commensurate with audience exposure and demographic makeup (referred to herein collectively as "audience configuration"). One way to gather media presentation information is to gather the media presentation information from media output devices (e.g., gathering television presentation data from a set-top box (STB) connected to a television). As used herein, media presentation includes media output by a media device regardless of whether or not an audience member is present (e.g., media output by a media output device at which no audience is present, media exposure to an audience member(s), etc.).

A media presentation device (e.g., STB) provided by a service provider (e.g., a cable television service provider, a satellite television service provider, an over-the-top (OTT) service provider, a music service provider, a movie service provider, a streaming media provider, etc.) or purchased by a consumer may contain processing capabilities to monitor, store, and transmit tuning data (e.g., which television channels are tuned by the media presentation device at a particular time) back to the service provider, which can then aggregate and provide such return path data to an audience measurement entity (e.g., The Nielsen Company (US), LLC) to analyze media presentation activity. Data transmitted from a media presentation device back to the service provider is referred to herein as return path data which may include census data. Return path data includes tuning data. Tuning data is based on data received from the media presentation device while the media presentation device is on (e.g., powered on, switched on, and/or tuned to a media channel, streaming, etc.). Although return path data includes tuning data, return path data may not include data related to the user viewing the media corresponding to the media presentation device. Accordingly, return path data may not be able to be associated with specific viewers, demographics, locations, etc. However, census data may be derived or extracted from return path data. Census data is indicative of the total percentage of a population of users (e.g., based on the return path data) that was exposed to media at a particular media segment. For example, if 20% of a population was exposed to a first media segment (e.g., a first 15 minute segment) of a television show, the census data may be indicative of the 20% exposure.

To determine aspects of media presentation data (e.g., which household member is currently consuming a particular media and the demographics of that household member), market researchers may perform audience measurement by enlisting a subset of the media consumers as panelists. Panelists or monitored panelists are audience members (e.g., household members, users, panelists, etc.) enlisted to be monitored, who divulge and/or otherwise share their media activity and/or demographic data to facilitate a market research study. An audience measurement entity typically monitors media presentation activity (e.g., viewing, listening, etc.) of the monitored panelists via audience measurement system(s), such as a metering device(s) and/or a local people meter (LPM). Audience measurement typically includes determining the identity of the media being presented on a media output device (e.g., a television, a radio, a computer, etc.), determining data related to the media (e.g., presentation duration data, timestamps, channel data, etc.), determining demographic information of an audience, and/or determining which members of a household are associated with (e.g., have been exposed to) a media presentation. For example, an LPM in communication with an audience measurement entity communicates audience measurement (e.g., metering) data to the audience measurement entity. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

In some examples, metering data (e.g., including media presentation data) collected by an LPM or other meter is stored in a memory and transmitted via a network, such as the Internet, to a datastore managed by the audience measurement entity. Typically, such metering data is combined with additional metering data collected from a group of LPMs monitoring a group of panelist households. The metering data may include, but are not limited to, a number of minutes a household media presentation device was tuned to a particular channel, a number of minutes a household media presentation device was used (e.g., consumed) by a household panelist member and/or a visitor (e.g., a presentation session), demographics of the audience (which may be statistically projected based on the panelist data), information indicative of when the media presentation device is on or off, and/or information indicative of interactions with the media presentation device (e.g., channel changes, station changes, volume changes, etc.), etc. As used herein, a channel may be a tuned frequency, selected stream, an address for media (e.g., a network address), and/or any other identifier for a source and/or carrier of media.

Examples disclosed herein receive the marginal ratings data for a group of media segments (e.g., different episodes of a television series, different quarter hour time slots of a television program, or a radio program, etc.) and estimate a population reach (e.g., a total number of deduplicated users that were exposed to media) across a union of the media segments. As used herein, a media segment refers to any segment (or division, subpart, etc.) associated with exposure to media. For example, if the media corresponds to an advertisement, the media segments may correspond to different websites that include the advertisement. In another example, if the media corresponds to a one-hour program, the media segments may correspond to four, 15-minute increments of the one-hour program. In yet another example, the media segments may correspond to different types of media devices that can be used to access and present the media of interest.

As used herein, a population reach value for a union (or combination, aggregation, etc.) of media segments (e.g., a union of program episodes, and union of quarter hour time slots, a union of websites, a union of media device types, etc.) represents a number of unique individuals of a population (also referred to as a deduplicated audience) that are associated with (e.g., exposed to, accessed, used, etc.) at least one of the media segments. For example, a reach value can be a count of the number of unique individuals of a population that are associated with (e.g., exposed to, accessed, used, etc.) at least one of the media segments, a percentage of the population that is associated with (e.g., exposed to, accessed, used, etc.) at least one of the media segments, etc. As such, the population reach value quantifies the deduplicated audience associated with the union of the media segments of interest.

In some examples, the audience measurement entity processes the collected and/or aggregated metering data from panelist meters and obtains (e.g., from one or more service provider) return path data for devices where a panel is not maintained. Return path data may include, for example, a total number of or a percentage of unique users (e.g., deduplicated users) from a universe of users that was exposed to media within different media segments (e.g., 15 minute increments, via different websites, via different media device types, etc.). However, return path data may be missing a total number of or a percentage of unique users from a universe of users (e.g., a population) that was exposed to the media within a union of the media segments (e.g., across the group of 15-minute increments, across the different websites, across the different media types, etc.). Some examples disclosed herein leverage panelist data to be able to estimate population reach across unions of media segments. Some examples disclosed herein leverage historical census data to be able to estimate population reach across unions of media segments.

For example, some technical solutions disclosed herein access first marginal ratings values for a group of media segments, such that respective ones of the first marginal ratings values represent respective portions of a first population associated with corresponding ones of the media segments. Disclosed example technical solutions also estimate a merge ratio based on a difference between a sum of the first marginal ratings values and a largest one of the first marginal ratings values. Disclosed example technical solutions further access second marginal ratings values for the plurality of media segments, such that respective ones of the second marginal ratings values represent respective portions of a second population associated with corresponding ones of the media segments. Disclosed example technical solutions also output, based on the merge ratio and the second marginal ratings values, a reach value for a union of the media segments. The reach value represents a number of unique individuals of the second population associated with at least one of the media segments.

In some examples, the first population may correspond to a panel population and the second population may correspond to a census population. In some examples, the reach value is a second reach value, and the technical solutions access a first reach value for the union of media segments, wherein the first reach value represents a number of unique individuals of the first population associated with at least one of the media segments. In some such examples, the technical solutions estimate the merge ratio based on the first reach value and the difference between the sum of the marginal ratings values and the largest one of the first marginal ratings values. For example, to estimate the merge ratio, such example technical solutions may subtract the largest one of the first marginal ratings values from the first reach value to determine a difference value, and divide the difference value by the difference between the sum of the marginal ratings values and the largest one of the first marginal ratings values to determine the merge ratio.

These and other example methods, apparatus, systems and articles of manufacture (e.g., physical storage media) to estimate and use nested merge ratios for audience measurement are disclosed in further detail below.

Turning to the figures, FIG. 1 is a block diagram of an environment in which example return path data 100 and, in some examples, example meter data 102 are collected to determine estimate and use merge ratio to determine population reach values based on marginal ratings values obtained for market segments. FIG. 1 includes the example return path data 100, the example meter data 102, an example media provider 104, an example media presentation device 106, example media output devices 108, 110, an example local people meter (LPM) 112, and an example audience measurement entity (AME) 114. The example audience measurement entity 114 includes an example return path data (RPD) audience storage 116, an example panelist data storage 118, and example population reach determination circuitry 120.

The example media provider 104 of FIG. 1 is a service provider (e.g., cable media service provider, a radio frequency (RF) media provider, a satellite media service provider, etc.) that presents media to an audience member via the example media presentation device 106. The media provided by the example media provider 104 is transmitted (e.g., via a wired or wireless network connection) to the media presentation device 106. The media presentation device 106 is connected, via a wired or wireless connection, to the example media output device 108 to output the media to an audience member. The media output device 108 is a device capable of outputting the received media. For example, the media output device 108 may be a television, a radio, speakers, a projector, a computer, a computing device, a tablet, a mobile device, and/or any other device capable of outputting media.

When the example media presentation device 106 of FIG. 1 is operating to access media, the media presentation device 106 receives media corresponding to a station, program, website, etc., based on the tuning of the example media presentation device 106. For example, the media presentation device 106 may be a set-top box. Additionally or alternatively, the example media presentation device 106 may be an over-the-top (OTT) device, a video game console, a digital video recorder (DVR), a digital versatile disc (DVD) player, a receiver, a router, a server, a computer, a mobile device, software executed by a website, computer, and/or application, and/or any device that receives media from a service provider. For example, the media presentation device 106 may be a website and/or application that provides media to users via the media output device 108. In some examples, the media presentation device 106 may implement a DVR and/or DVD player. In some examples, the example media presentation device 106 includes a unique serial number that, when associated with subscriber information, allows an audience measurement entity, a marketing entity, and/or any other entity to ascertain specific subscriber behavior information.

By way of example, the example media presentation device 106 may be tuned to channel 5. In such an example, the media presentation device 106 outputs media (from the example media provider 104) corresponding to the tuned channel 5. The media presentation device 106 may gather tuning data corresponding to which channels, stations, websites, etc., that the example media presentation device 106 was tuned. The example media presentation device 106 generates and transmits the example return path data 100 (e.g., census data corresponding to the total population of users) to the example media provider 104. The example return path data 100 includes the tuning data and/or data corresponding to the example media provider 104. Although the illustrated example of FIG. 1 includes the example media provider 104 receiving the example return path data 100 from one media presentation device (e.g., the example media presentation device 106), at one location, corresponding to one media provider (e.g., the example media provider 104), the example media provider 104 may receive return path data 100 from any number or type(s) of media presentation devices, at any number of locations. The media provider 104 transmits the collected return path data 100 to the example audience measurement entity 114. Additionally or alternatively, the audience measurement entity 114 may be hosted by any other entity or may be co-hosted by another entity (ies). For example, the example return path data 100 may be collected from the example media presentation devices 106 by a media provider (e.g., a cable television provider, a satellite television provider, etc.) and the example meter data 102 may be collected from an LPM (e.g., such as the example LPM 112) by the example audience measurement entity 114 cooperating with the media provider to gain access to the tuning data. The example audience measurement entity 114 includes the example return path data audience storage 116 (e.g., a database) and the example panelist data storage 118 (e.g., a database).

The example media output device 110 of FIG. 1 is a device capable of outputting the received media. For example, the media output device 110 may be a television, a radio, speakers, a projector, a computer, a computing device, a tablet, a mobile device, and/or any other device capable of outputting media. In some examples, the media output device 110 receives media over-the-air. In this manner, the media output device 110 receives media via an antenna and does not correspond to a media provider (e.g., including the example media provider 104). In the illustrated example of FIG. 1, the media output device 110 corresponds to one or more monitored panelists. The example LPM 112 monitors the panelists exposure to media output by the example media output device 110. For example, the example LPM 112 is in communication with the example media output device 110 to collect and/or capture signals emitted externally by the media output device 110. The LPM 112 may be coupled with the media output device 110 via wired and/or wireless connection. The example LPM 112 may be implemented in connection with additional and/or alternative types of media presentation devices, such as, for example, a radio, a computer monitor, a video game console, and/or any other device capable of presenting media to a user. The LPM 112 may be a portable people meter, a cell phone, a computing device, a sensor, and/or any other device capable of metering (e.g., monitoring) user exposure to media. In some examples, a media presentation location may include a group of LPMs 112. In such examples, the group of the LPMs 112 may be used to monitor media exposure for multiple users and/or media output devices 110. Additionally, the example panelist data storage 118 receives and stores the example meter data 102 from the example LPM 112.

In some examples, the example LPM 112 of FIG. 1 includes a set of buttons assigned to audience members to determine which of the audience members is watching the example media output device 110. The LPM 112 may periodically prompt the audience members via a set of LEDs, a display screen, and/or an audible tone, to indicate that the audience member is present at a first media presentation location by pressing an assigned button. In some examples, to decrease the number of prompts and, thus, the number of intrusions imposed upon the media consumption experience of the audience members, the LPM 112 prompts only when unidentified audience members are located at the first media presentation location and/or only after the LPM 112 detects a channel change and/or a change in state of the media output device 110. In other examples, the LPM 112 may include at least one sensor (e.g., a camera, 3-dimensional sensor, etc.) and/or be communicatively coupled to at least one sensor that detects a presence of the user in a first example media presentation location. The example LPM 112 transmits the example meter data 102 to a media researcher and/or a marketing entity. The example meter data 102 includes the media presentation data (e.g., data related to media presented while the media output device 110 is on and a user is present). The example meter data 102 may further include a household identification, a tuner key, a presentation start time, a presentation end time, a channel key, etc. Although the illustrated example illustrates the example audience measurement entity 114 collecting the example meter data 102 from one LPM 112 at one location, the example audience measurement entity 114 may collect meter data from any number or type of meters at any number of locations.

The example return path data 100 of FIG. 1 from the example media presentation device 106 and/or the example meter data 102 from the example LPM 112 is transmitted to the example audience measurement entity 114 via a network. The network may be implemented using any type of public or private network, such as, but not limited to, the Internet, a telephone network, a local area network (LAN), a cable network, and/or a wireless network. To enable communication via the network, the example media presentation device 106 includes a communication interface that enables a connection to an Ethernet medium, a digital subscriber line (DSL), a telephone line, a coaxial cable, or any wireless connection, etc.

The example return path data audience storage 116 of the example AME 114 of FIG. 1 collects the example return path data 100 corresponding to the example media presentation device(s) 106. As described above, the example return path data 100 includes tuning data of the example media presentation device 106. However, in some examples, the example return path data 100 may not include specific data identifying any information relating to the audience of the example media output device 108. In such examples, another device and/or processor models such audience information prior to storing in the example return path data audience storage 116. For example, the device and/or processor may assign and/or model virtual users to augment the example return path data 100, thereby generating audience assigned return path data.

In the illustrated example of FIG. 1, the return path data 100 stored in the RPD audience storage 116 is representative of a census population, and includes census data such as census marginal ratings values for one or more groups of media segments. As noted above, a media segment refers to any segment (or division, subpart, etc.) associated with exposure to media. For example, media segments may correspond to different time intervals (e.g., 15-minute time intervals, 30-minute time intervals, 1 hour time-intervals, etc.), or groups/unions of time intervals, during which media exposure (e.g., exposure to television programming, radio programming, commercials, etc.) is to be monitored. As another example, media segments may correspond to different websites, or groups/unions of websites, among a collection of websites for which media exposure (e.g., advertisement exposure, website accesses, etc.) is to be monitored. As yet a further example, media segments may correspond to different types media devices, or groups/unions of media device types, among a collection of media device types (e.g., such as televisions, smartphones, tablets, personal computers, game consoles, etc.) for which media exposure is to be monitored. As still another further example, media segments may correspond to different episodes, or groups/unions of episodes, of one or more media programs (e.g., television programs, radio programs, movies, etc.), media genres, etc., for which media exposure is to be monitored. The foregoing examples of media segments are but a few examples of ways media segments may be specified in the context of monitoring media exposure, performing audience measurement, etc.

As noted above, the RPD audience storage 116 stores census marginal ratings values for one or more groups of media segments. The census marginal ratings may be in the form of counts and/or percentages of census population members respectively associated with (e.g., exposed to, having accessed, users of, etc.) one or more of the group of media segments of interest. In some examples, the census population corresponds to the subscriber base of one or more media providers, network (e.g., Internet) service providers, etc. In some examples, the census population corresponds to a population associated with one or more geographic areas (e.g., one or more cities, countries, etc.) As such, the census marginal ratings can correspond to, but are not limited to, counts/percentages of census population members associated with (i) different time intervals, or groups/unions of time intervals, during which media exposure, (ii) different websites, or groups/unions of websites, among a collection of websites for which media exposure is to be monitored, (iii) different types media devices, or groups/unions of media device types, among a collection of media device types for which media exposure is to be monitored, (iv) different episodes, or groups/unions of episodes, of one or more media programs, media genres, etc., for which media exposure is to be monitored, etc. In some examples, the census marginal ratings are computed from the return path data 100 by the population reach determination circuitry 120 and/or another processor resource(s) associated with the AME 114.

Similarly, the panelist data storage 118 stores panel marginal ratings values for one or more groups of media segments. Like the census marginal ratings, the panel marginal ratings may be in the form of counts and/percentages of panel population members respectively associated with (e.g., exposed to, having accessed, users of, etc.) one or more of the group of media segments of interest. However, in contrast with the census population, the panel population corresponds to a group of panelists included one or more panels formed by the AME 114 to monitor media exposure and identify audience demographics for audience measurement associated with the one or more group of media segments of interests. Thus, the panel marginal ratings can correspond to, but are not limited to, counts/percentages of panelists associated with (i) different time intervals, or groups/unions of time intervals, during which media exposure is to be monitored, (ii) different websites, or groups/unions of websites, among a collection of websites for which media exposure is to be monitored, (iii) different types media devices, or groups/unions of media device types, among a collection of media device types for which media exposure is to be monitored, (iv) different episodes, or groups/unions of episodes, of one or more media programs, media genres, etc., for which media exposure is to be monitored, etc. In some examples, the panel marginal ratings are computed from the meter data 102 by the population reach determination circuitry 120 and/or another processor resource(s) associated with the AME 114.

In the illustrated example, because the meter data 102 is also able to provide demographic information and other detailed measurements associated with the panelists, the panelist data storage 118 also stores panel reach values for union(s) (also referred to as combination(s), aggregation(s), etc.) of the one or more groups of media segments of interest. Based on the description of population reach values provided above, a panel reach value for a union of media segments is representative of a number of unique panelists of the panel population (also referred to as a deduplicated panel audience) that are associated with (e.g., exposed to, accessed, used, etc.) at least one of the media segments included in the union of media segments. The panel reach value may be expressed as a count of the number of unique panelists, a percentage of the unique panelists of the panel, etc., which represents a size of the deduplicated panel audience associated with at least one of the media segments included in the union of media segments. Thus, the panel reach values can correspond to, but are not limited to, counts/percentages of unique panelists associated with (i) a union of different time intervals during which media exposure is to be monitored, (ii) a union of different websites among a collection of websites for which media exposure is to be monitored, (iii) a union of media device types among a collection of media device types for which media exposure is to be monitored, (iv) a union of episodes for one or more media programs, media genres, etc., for which media exposure is to be monitored, etc. In some examples, the panel reach values are computed from the meter data 102 by the population reach determination circuitry 120 and/or another processor resource(s) associated with the AME 114.

In the illustrated example, the demographics of the census population is unknown from the return path data 100 and, thus, census reach values are not readily available in the RPD audience storage 116. To provide this missing information, the population reach determination circuitry 120 operates to determine one or more merge ratios that enable determination of census reach values for the census population based on the available census marginal ratings values stored in the RPD audience storage 116 for the census population, and the determined merge ratios. As disclosed in further detail below, in some examples, the population reach determination circuitry 120 determines the merge ratios based on the panel marginal ratings values and panel reach values stored in the panelist data storage 118 for the panel population. As disclosed in further detail below, in some examples, the population reach determination circuitry 120 determines the merge ratios based on historical census marginal ratings values and census reach values stored in the RPD audience storage 116 for the census population.

Some prior audience measurement systems estimate and use a duplication factor that is a multiplier that accounts for duplication across population members, devices, platforms, websites, etc., associated with measurement of media exposure for one or more groups of media segments. For example, consider media segments corresponding to different television programs being monitored to determine televisions ratings. Assume there are k programs and $n_i$ people were measured as being exposed to the $i^{th}$ program. Thus, $n_i$ corresponds to a marginal rating value for the $i^{th}$ program. As each person has the possibility of viewing multiple programs, there may be double counting of people among the $n_i$ audiences. To estimate the total de-duplicated audience across all programs, some prior audience measurement techniques compute a duplication factor, $d_f$, according to Equation 1, which is:

$$N = d_f \sum_{i=1}^{k} n_i \qquad \text{Equation 1}$$

In Equation 1, N represents the de-duplicated audience, or reach value, for the total set of k programs, which corresponds to the number of unique individuals of the population that were exposed to at least one of the programs. In some prior audience measurement techniques, the value of the duplication factor, $d_f$, is determined from Equation 1 using panel data for which the panel marginal rating values and a reach value for the set of k programs are available. The duplication factor, $d_f$, determined from the panel data is then applied to the census marginal rating values, $n_i$, according to Equation 1.

For example, consider an example panel study in which the panel marginal rating values across three programs were {0.10, 0.05, 0.20}, and the panel reach value for the three programs was 0.30. Based on Equation 1, an example prior audience measurement technique described above may compute the duplication factor, $d_f$, according to Equation 2, which is:

$$d_f = \frac{N}{\sum_{i=1}^{k} n_i} = \frac{0.30}{(0.10 + 0.05 + 0.20)} = 0.8571 \qquad \text{Equation 2}$$

Thus, in this example, the duplication factor, $d_f$, determined from the panel data indicates that measured panel reach for the three programs was about 85% of the total panel population (or 85% of the total possible reach for the panel population). Next, assume that the census marginal rating values for the three programs were determined from the return path data for a census population to be {0.08, 0.07, 0.25}. The example prior audience measurement technique described above may use Equation 1 to estimate the census reach value, N, based on the duplication factor, $d_f$, determined from the panel data and the census marginal rating values, which yields the following estimate shown in Equation 3:

$$N = d_f \sum_{i=1}^{k} n_i = 0.8571(0.08 + 0.07 + 0.25) = 0.3428 \qquad \text{Equation 3}$$

Thus, in this example, the estimated de-duplicated census audience, or census reach, across the three programs is estimated by the prior audience measurement technique to be 0.3428.

Although the duplication factor, $d_f$, determined above by the example prior audience measurement techniques has some intuitive appeal and is simple to explain, it has some problems. Two of these problems are that the estimated reach resulting from such a prior duplication factor, $d_f$, can exceed 100% (or, in other words, can be greater than the entire population), or that the estimated reach resulting from such a prior duplication factor, $d_f$, could be smaller than the largest ratings. The latter is also impossible because if $n_i$ people are in $i^{th}$ category, then at least $n_i$ people must be in the total de-deduplicated audience. Equations 4 and 5 provide two examples of estimating reach (or, in other words, the de-duplicated audience) in which the two impossible cases described above can occur:

$$N=0.5(0.30+0.80+0.40+0.70)=1.1>100\% \text{ (impossible)} \qquad \text{Equation 4}$$

$$N=0.3(0.10+0.20+0.25)=0.165<25\% \text{ (impossible)} \qquad \text{Equation 5}$$

The foregoing problems can arise because the example prior audience measurement techniques may not account for some important logical constraints, such as (i) the maximum reach value is bounded above by 100%, and (ii) the minimum reach value is bounded below by the largest marginal rating value. The example prior audience measurement techniques described above may not account for the first logical constraint because the reach is estimated based on a sum of the marginal ratings values multiplied by a scale factor (i.e., the duplication factor, $d_f$). This can cause the problem of the estimated reach being greater than 100% because, even after multiplying the sum of the marginal ratings values by the duplication factor, the post-multiplied value may still be greater than 100%. The example prior audience measurement techniques described above may not account for the second logical constraint described above because there is no modification or allowance to account for the fact that the estimated reach has to be at least as large as the largest marginal audience. Example population reach determination circuitry 120 disclosed herein are designed based on Fréchet inequalities account for both of foregoing logical constraints.

Figure 2:
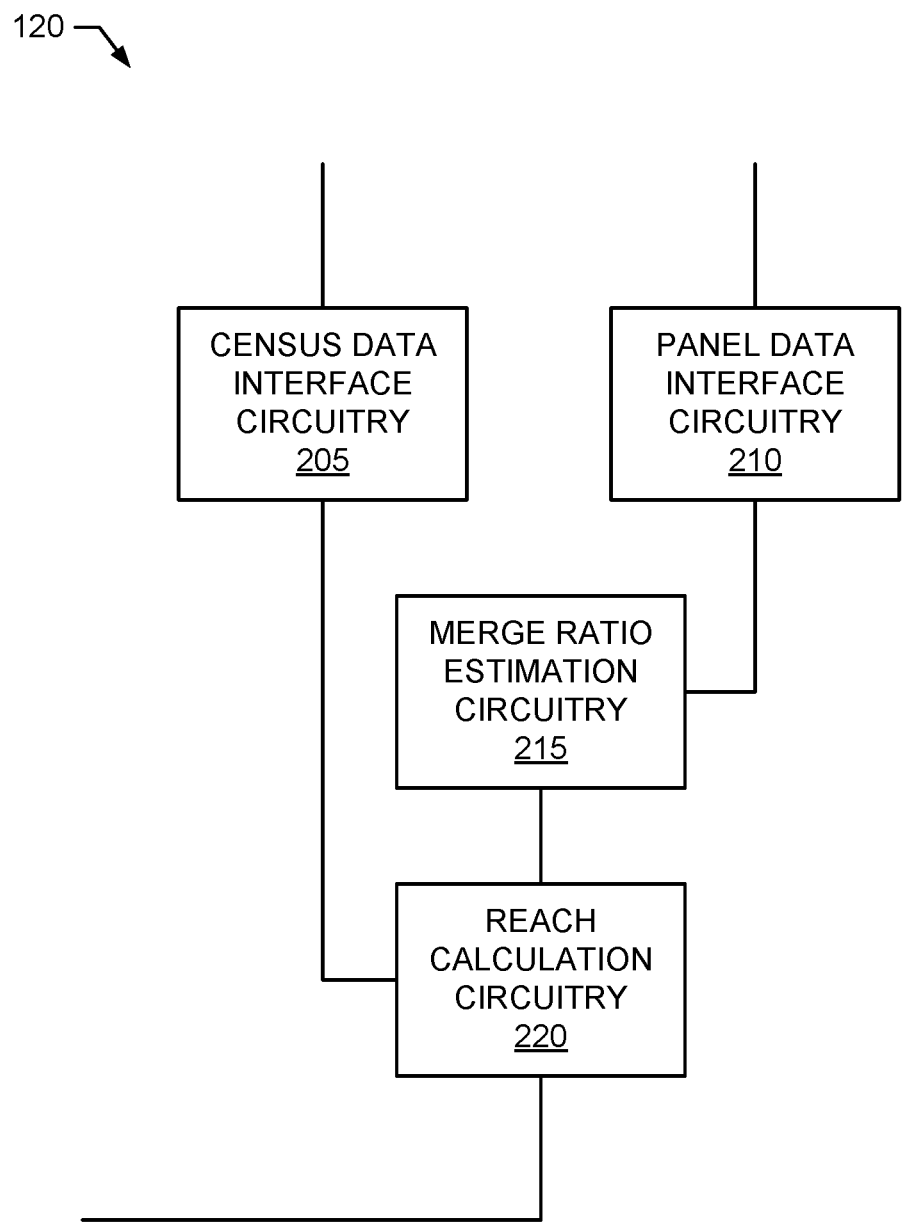
FIG. 2 is a block diagram of a first example implementation of the population reach determination circuitry of FIG. 1.

A block diagram of a first example implementation of the population reach determination circuitry 120, which estimates and uses merge ratios, also referred to as Fréchet ratios, that are based on Fréchet inequalities, is illustrated in FIG. 2. The example population reach determination circuitry 120 of FIG. 2 includes example census data interface circuitry 205, example panel data interface circuitry 210, example merge ratio estimation circuitry 215 and example reach calculation circuitry 220. The example population reach determination circuitry 120 of FIG. 2 is based on Fréchet inequalities as follows. For n sets labeled $A_i$ with probability of inclusion in set $A_i$ being $P_i=\Pr(A_i)$, then the following Fréchet inequalities are true for the probabilities of intersection of the sets $A_i$ and unions of the sets $A_i$:

Intersection: $\max(0,(\Sigma_i P_i)-(n-1)) \leq \Pr(\cap A_i) \leq \min(P_i)$

Union: $\max(P_i) \leq \Pr(\cup A_i) \leq \min(1,\Sigma_i P_i)$ \qquad Equation 6

The Fréchet inequalities of Equation 6 can be considered rules about how to bound calculations involving probabilities without assuming independence or, indeed, without making any dependence assumptions whatsoever. The Union inequality of Equation 6 is relevant to the design of the example population reach determination circuitry 120 of FIG. 6. This is because the sets $A_i$ correspond to the media segments described above, the probabilities $P_i=\Pr(A_i)$ correspond to the marginal ratings values described above, and the probability of being in the union of the sets $A_i$, that is, $Pr(\cup A_i)$, corresponds to the reach value described above. As such, the Union inequality of Equation 6 provides that the minimum value for the probability of being in the union of the sets $A_i$ (or, in other words, the minimum reach value) is the largest probability $P_i=Pr(A_i)$ (or, in other words, the largest marginal ratings value). Furthermore, the Union inequality of Equation 6 provides that the maximum value for the probability of being in the union of the sets $A_i$ (or, in other words, the maximum reach value) is the sum of the probabilities $P_i=Pr(A_i)$ (or, in other words, the sum of the marginal ratings values), with a ceiling of 100%.

In the illustrated example, the Fréchet inequalities of Equation 6 are used to define a ratio of how far into the theoretical region it is possible for the true union audience (e.g., the true reach value) to be. That is, consider the Union inequality of Equation 6, which is reproduced in Equation 7 below:

$$\text{Union: } \max(P_i) \leq Pr(\cup A_i) \leq \min(1, \Sigma_i P_i) \quad \text{Equation 7}$$

Next, define a Lower Bound value, LB, as the left-hand side of Equation 7 (e.g., the largest probability $P_i=Pr(A_i)$ or, in other words, the largest marginal ratings value), and an Upper Bound value, UB, as the right-hand side of Equation 7 (e.g., the sum of the probabilities $P_i=Pr(A_i)$ or, in other words, the sum of the marginal ratings values, with a ceiling of 100%). If a true audience reach, Pr(A), was measured, where $A=\cup A_i$ is the deduplicated union of the audience across the events, and $Pr(A)=Pr(\cup A_i)$ is the probability of the deduplicated union of the audience, then the Fréchet ratio, r, can be defined according to Equation 8, which is:

$$r = \frac{Pr(A) - LB}{UB - LB} \quad \text{Equation 8}$$

If r=0, that would imply that there is complete overlap between the maximum marginal audience and all other smaller marginal audiences. If r=1, that would imply there are either completely disjoint marginal audience sets (mutually exclusive), or that the theoretical maximum reached 100% and audience was, therefore, 100%.

In the illustrated example of FIG. 2, the population reach determination circuitry 120 calculates the Fréchet ratio, r, given by Equation 8, which is also referred to herein as a merge ratio. Thus, the resulting merge ratio based on Equation 8 is a scalar number that is memory efficient and provides a quick first-order estimate of reach, while having the benefit of ensuring the calculated reach does not fall outside the logical bounds.

As an example of the population reach determination circuitry 120 of FIG. 2 estimating reach based on the merge ratio, r, given by Equation 8, consider a panel study across three media programs that measured panel marginal ratings values of {0.10, 0.05, 0.20} across the three programs, and a panel reach of 0.30 for the three programs. The Fréchet-based merge ratio, r, of Equation 8 for this example is given by Equation 9, which is:

$$r = \frac{0.30 - 0.20}{0.35 - 0.20} = 0.6666 \quad \text{Equation 9}$$

In Equation 9, the lower bound, LB, is 0.2, which is the maximum of the panel marginal ratings values {0.10, 0.05, 0.20}, and the upper bound, UB, is 0.35, which is the sum of the panel marginal ratings values {0.10, 0.05, 0.20}. The resulting merge ratio, r, of Equation 9 indicates that the measured panel reach was two-thirds along the range of theoretically possible reach values given the measured panel marginal ratings values. Next, assume that, for a census population, the measured census marginal ratings values are {0.08, 0.07, 0.25}. Using the merge ratio, r, determined from the panel data, the census reach, Pr(N), for the three programs can be estimated based on Equation 8, with Pr(A) being replaced by Pr(N) as shown in Equation 10, which is:

$$0.6666 = \frac{Pr(N) - 0.25}{0.40 - 0.25} \quad \text{Equation 10}$$

In Equation 10, the lower bound, LB, is 0.25, which is the maximum of the census marginal ratings values are {0.08, 0.07, 0.25}, and the upper bound, UB, is 0.40, which is the sum of the census marginal ratings values are {0.08, 0.07, 0.25}. Rewriting Equation 10 to solve for the census reach N yields Equation 11:

$$Pr(N)=0.25+0.6666(0.40-0.25)=0.35 \quad \text{Equation 11}$$

Thus, the estimated census reach value for this example is Pr(N)=0.35.

Generalizing Equation 11, the population reach determination circuitry 120 of FIG. 2 estimates a census reach value based on the Fréchet-based merge ratio, r, of Equation 8 and the census marginal ratings values according to Equation 12, which is:

$$Pr(N)=LB+r(UB-LB) \quad \text{Equation 12}$$

In Equation 12, the value of LB is calculated from the census marginal ratings values using the left-hand side of Equation 7, and the value of UB is calculated from the census marginal ratings values using the right-hand side of Equation 7. As can be seen from Equation 12, even if the value of r was at the extremes of 0 or 1, the corresponding audience reach estimate would still be between the theoretical lower and upper bounds, and, thus, cannot be less than the maximum marginal audience nor greater than 100%.

With the foregoing in mind, the example population reach determination circuitry 120 of FIG. 2 includes the example panel data interface circuitry 210 to access the panelist data storage 118 to obtain the panelist marginal ratings values (e.g., the set of panel $P_i$ values for the media segments $A_i$) and the panelist reach value (e.g., the panel Pr(A) value) measured for a given panel population being associated with (e.g., exposed to, accessed, used, etc.) a group of media segments (e.g., the media segments $A_i$). Likewise, the example population reach determination circuitry 120 of FIG. 2 includes the example census data interface circuitry 205 to access the RPD audience storage 116 to obtain the census marginal ratings values (e.g., the set of census $P_i$ values for the media segments $A_i$) for a given census population being associated with (e.g., exposed to, accessed, used, etc.) the group of media segments (e.g., the media segments $A_i$).

The example population reach determination circuitry 120 of FIG. 2 includes the example merge ratio estimation circuitry 215 to estimate a merge ratio based on Equation 8, as described above. Thus, the merge ratio estimation circuitry 215 of the illustrated example estimates the merge ratio (e.g., r) based on a difference (e.g., UB−LB from the panel data) between a sum of the panel marginal ratings values (e.g., UB=$\Sigma_i P_i$ from the panel data, but limited to 1, or 100%) and a largest one of the panel marginal ratings values (e.g., LB=max ($P_i$) from the panel data). More specifically, and with reference to Equation 8, in the illustrated example, the merge ratio estimation circuitry 215 estimates the merge ratio, r, by computing a difference (e.g., Pr (A)−LB) between the panel reach value (Pr(A)) for the union of media segments and the largest one of the panel marginal ratings values (e.g., LB=max ($P_i$)), and divides that difference by the difference (e.g., UB−LB) between the sum of the panel marginal ratings values (e.g., UB=$\Sigma_i P_i$, but limited to 1, or 100%) and the largest one of the panel marginal ratings values (e.g., LB=max ($P_i$)).

The example population reach determination circuitry 120 of FIG. 2 includes the example reach calculation circuitry 220 to calculate and output a census reach value based on Equation 12 provided above. Thus, the reach calculation circuitry 220 of the illustrated example calculates and outputs the panel reach value (e.g., Pr(N)) based on the merge ratio, r, estimated by the merge ratio estimation circuitry 215 and the census marginal ratings values (e.g., the set of census $P_i$ values) for the union of media segments (e.g., the union of the media segments $A_i$). More specifically, and with reference to Equation 12, in the illustrated example, the reach calculation circuitry 220 determines a difference (e.g., UB−LB based on the census data) between a sum of the census marginal ratings values (e.g., UB=$\Sigma_i P_i$ from the census data, but limited to 1, or 100%) and a largest one of the census marginal ratings values (e.g., LB=max ($P_i$) from the census data). The reach calculation circuitry 220 of the illustrated example then adds the largest one of the census marginal ratings values (.g., LB=max ($P_i$) from the census data) to a product of the computed difference (e.g., UB−LB based on the census data) and the merge ratio (e.g., r) to determine the census reach value (e.g., Pr(N)) for the union of the media segments (e.g., the union of the media segments $A_i$).

Figure 3:
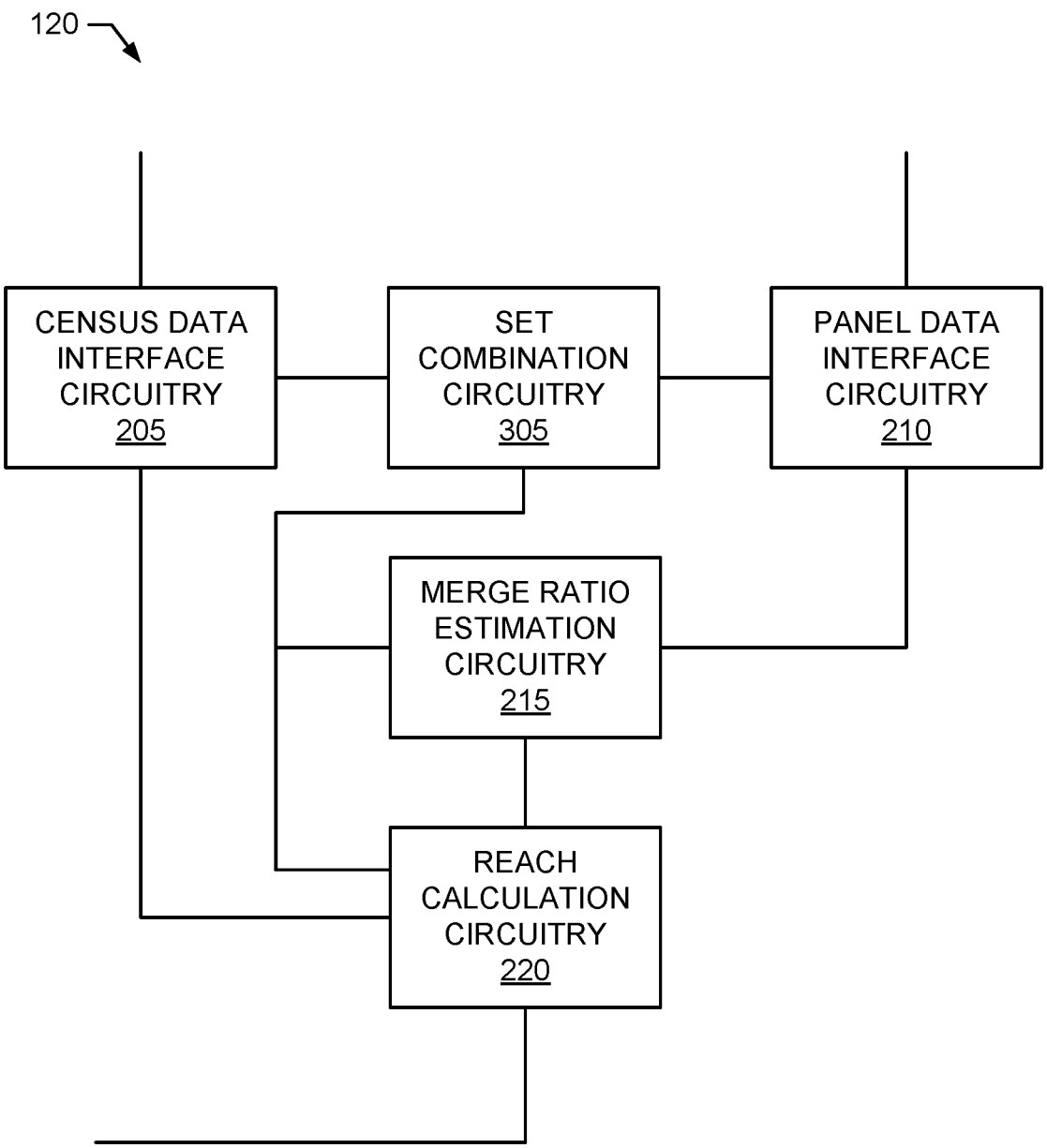
FIG. 3 is a block diagram of a second example implementation of the population reach determination circuitry of FIG. 1.

A block diagram of a second example implementation of the population reach determination circuitry 120, which is based on Fréchet inequalities, is illustrated in FIG. 3. The example population reach determination circuitry 120 of FIG. 3 includes the example census data interface circuitry 205, the example panel data interface circuitry 210, the example merge ratio estimation circuitry 215 and the example reach calculation circuitry 220 of FIG. 2, which are described in detail above in the context of FIG. 2. The example population reach determination circuitry 120 of FIG. 3 also includes example set combination circuitry 305 to enable the reach determination circuitry 120 to estimate and use nested merge ratios, also referred to as nested Fréchet ratios, for audience measurement in accordance with teachings of this disclosure.

Like the population reach determination circuitry 120 of FIG. 2, the example population reach determination circuitry 120 of FIG. 3 is based on the Fréchet inequalities, which can be considered rules about how to bound calculations involving probabilities without assuming independence or, indeed, without making any dependence assumptions whatsoever. As noted above, there are two sets of inequalities: one for intersections and one for unions. Like the population reach determination circuitry 120 of FIG. 2, it is the union inequality on which the population reach determination circuitry 120 is based.

As explained above, for a set of events with probabilities, Pr($A_1$), Pr($A_2$), . . . , the probability of the union of those events is bounded according to Equation 13, which is:

$$\max(P_i) \leq Pr(\cup A_i) \leq \min(1, \Sigma_i P_i) \quad \text{Equation 13}$$

where $P_i$=Pr($A_i$). For example, given Pr($A_1$)=0.7 and Pr($A_2$)=0.8, then probability of the union of those two events is given by Equation 14, which is:

$$0.8 \leq Pr(A_1 \text{ or } A_2) \leq 1 \quad \text{Equation 14}$$

As also explained above in the context of Equation 8, if the value of the probability of the union is available, then the Fréchet ratio of Equation 8 specifies the proportion within the logical bounds where the probability of the union belongs. For example, if Pr($A_1$ or $A_2$)=0.95, then the Fréchet ratio (or merge ratio) is given by Equation 15, which is:

$$r=(0.95-0.8)/(1-0.8)=0.15/0.2=0.75 \quad \text{Equation 15}$$

In Equation 15, the value of r=0.75 for the Fréchet ratio indicates the actual probability of the union lies 75% within the logical bounds starting from the lower bound and going to the upper bound.

The Fréchet inequality can also be defined in terms of raw counts where 100% is represented as the maximum possible count, such as the Universe Estimate (UE) of population. The union of different sets of events with audiences {$A_1, A_2$, . . . } can be interpreted as the deduplicated union of the audience across the events, represented by the variable A above. That is, the bounds specified by the Fréchet inequality for the union of different sets of events with audiences {$A_1, A_2$, . . . } is given by Equation 16, which is:

$$\max(A_i) \leq A = \cup A_i \leq \min(UE, \Sigma_i A_i) \quad \text{Equation 16}$$

For example, given UE=1000 people, with $A_1$=300 for event 1, $A_2$=400 for event 2 and $A_3$=500 for event 3, then using Equation 16, the bounds for the deduplicated union of the audience across the events, A=$\cup A_i$, are given by Equation 17, which is:

$$500 \leq \text{Deduplicated Union}(A=\cup A_i) \leq 1000 \quad \text{Equation 17}$$

The preceding example demonstrates that, if 300 people attended event 1, 400 people event 2, and 500 people event 3, then the total number of unique individuals that attended any event is between 500 and total population of 1,000. The Upper bound is 1,000 and not 300+400+500=1,200, as 1,200 is greater than the specified UE of the population.

The Fréchet ratio (also referred to as the merge ratio) for raw audience counts is defined similarly as for probabilities. In particular, with reference to Equation 8 above, the Fréchet ratio for raw audience counts is given by Equation 18, which is:

$$r = \frac{A - LB}{UB - LB} \quad \text{Equation 18}$$

In Equation 18, the lower bound (LB) and upper bound (UB) correspond to the bounds specified by Equation 16. In other words, in Equation 18, LB=max($A_i$) and UB=min(UE, $\Sigma_i A_i$). Thus, in the preceding example, if 750 people actually attended any event, then the Fréchet ratio would be (750−500)/(1000−500)=½=0.5.

In accordance with the description of FIG. 2 above, in some examples, the example population reach determination circuitry 120 of FIG. 3 also utilizes the Fréchet ratio to estimate deduplicated audiences when prior information is available, such as panel audience measurements obtained via the example panel data interface circuitry 210 (e.g., such as the panel audience measurements $A_i$ for a set of events and the deduplicated union of the panel audience across the events, A=$\cup A_i$, and/or census audience measurements obtained via the example census data interface circuitry 205 for a population (e.g., such as the census audience measurements $A_i$ for the set of events).

For example, consider a scenario in which there are five events with panel measurements of $A_i=\{33, 10, 18, 15, 36\}$ people that were recorded among 100 total possible panelists as obtained via the panel data interface circuitry 210. Any individual can belong to any combination of events. Further, assume that the actual total deduplicated panel audience was A=58 people. In this example, the example merge ratio estimation circuitry 215 of the population reach determination circuitry 120 calculates the Fréchet inequalities for the panel audience according to Equation 16 as:

Lower Bound=LB=Max[{33,10,18,15,36}]=36

Upper Bound=UB=Min[100,33+10+18+15+36]=100    Equation 19

The merge ratio estimation circuitry 215 further calculates the Fréchet ratio according to Equation 18 as:

$r$=(58−36)/(100−36)=0.34375    Equation 20

In this same example, assume that within the broader census audience, audience measurements of {208, 441, 336, 509, 527} individuals across the same events were obtained from the census data interface circuitry 205, with UE=10,000 people also obtained via the census data interface circuitry 205. In this example, the example reach calculation circuitry 220 of the population reach determination circuitry 120 calculates the Fréchet inequalities for the census audience according to Equation 16 as:

Lower Bound=LB=Max[{208,441,336,509,527}]=527

Upper Bound=UB=Min[10000,208+441+336+509+527]=2021    Equation 21

Then, assuming the same Fréchet ratio as the panel, the reach calculation circuitry 220 uses Equation 22 to solve for the unknown deduplicated union of the census audience, which is:

$N$=LB+$r$(UB−LB)    Equation 22

Equation 22 corresponds to replacing the deduplicated panel audience A with the deduplicated census audience N in Equation 18, and then solving for N. Continuing with the preceding example, the reach calculation circuitry 220 evaluates Equation 22 using the lower and upper bounds of Equation 21 and the Fréchet ratio r calculated for the panel according to Equation 20 to estimate the deduplicated census audience across the union of events as:

$N$=527+0.34375(2021−527)=1041(after rounding)    Equation 23

Thus, in this example, the reach calculation circuitry 220 would estimate that within the census there were 1,041 unique individuals across the five events.

The example population reach determination circuitry 120 of FIG. 3 also includes the example set combination circuitry 305 to use the Fréchet ratio in a nested or hierarchical manner (e.g., also referred to as nested merge ratios) by taking into account proper labelling of what unions are being made. In some such examples, the set combination circuitry 305 of the population reach determination circuitry 120 employs a restriction that at all levels the indices of events being merged must be mutually exclusive between the sets.

For example, consider the union formed by merging events {1} and {2} into a merged event A={1, 2}. That is valid under the restriction defined above. The unions formed by merging events {3} and {4} into a merged union event B={3, 4} and events {5} and {6} into a merged union event C={5, 6} are also valid under the restriction defined above. Additionally, the merging of the three previously mentioned unions A={1, 2}, B={3, 4}, C={5, 6} into a merged union event D={1, 2, 3, 4, 5, 6} is also valid under the restriction defined above. However, the merged union events E={1, 2, 3} and F={3, 4, 5} cannot be merged, under the restriction defined above, to produce the merged union event G {1, 2, 3, 4, 5} as the event index "3" appears in both sets. However, the merged union events F={1, 2, 3} and G={4, 5, 6} could be merged, under the restriction defined above, to produce D={1, 2, 3, 4, 5, 6}.

As another example, consider a measurement across six events with panel event audiences {10, 15, 16, 21, 21, 45} people and 100 total panelists as obtained via the panel data interface circuitry 210. Further, assume the following merged event panel audiences are known and obtained from the panel data interface circuitry 210:

(i) Panel audience for the union of events {1}, {2}, {3} into merged event A={1, 2, 3} is 35 people;
(ii) Panel audience for the union of events {4}, {5} into merged event B={4, 5} is 30 people; and
(iii) Panel audience for the total union across the all sets into the merged set C={1, 2, 3, 4, 5, 6} is 85 people.

Notice the final union above corresponds to the deduplication of the three given merged unions A={1, 2, 3} and B={4, 5} with set {6} into the merged union C={1, 2, 3, 4, 5, 6}, and is not the overall union of the individual sets {1}, ..., {6} themselves. The intermediate sub-unions A={1, 2, 3} and B={4, 5} provide information which further restricts the lower and upper bounds of the total union C={1, 2, 3, 4, 5, 6}.

In this example, the set combination circuitry 305 instructs, controls or otherwise causes the merge ratio estimation circuitry 215 of the population reach determination circuitry 120 to construct the Fréchet ratio at each valid event merging (or union) nesting (or hierarchical) level as follows:

For events {1}, {2}, {3} merging to merged event A={1, 2, 3}, the set combination circuitry 305 instructs the merge ratio estimation circuitry 215 to compute the Fréchet ratio as r=(35−16)/(41−16)=0.76.

For events {4}, {5} merging to merged event B={4, 5}, the set combination circuitry 305 instructs the merge ratio estimation circuitry 215 to compute the Fréchet ratio as r=(30−21)/(42−21)=0.428571.

For merged events A={1, 2, 3} and B={4, 5}, and event {6} merging to merged event C={1, 2, 3, 4, 5, 6}, the set combination circuitry 305 instructs the estimation circuitry 215 to compute the Fréchet ratio as r=(85−45)/(100−45) =0.727273.

The last nested/hierarchical event in the example above is corresponds to the union of the merged events A=35 people (panelists) and B=30 people (panelists) with the initial event {6}=45 people (panelists), and total panel population=100. Applying Fréchet inequality directly yields a lower bound of LB=max[35, 30, 45]=45 and an upper bound of UB=min [100, 35+30+45]=100. Thus, the final merged union C has between 45 and 100 people (panelists). Knowing that the true union is 85 panelists produces the overall Fréchet ratio of r=(85-45)/(100-45)=0.727273.

Continuing this example, assume the census audience was observed to have individual event audiences of {363, 480, 486, 792, 823, 956} across the same 6 events, and with UE=10,000 people for the census audience, as obtained via the census data interface circuitry 205. The nested Fréchet ratios (also referred to as nested merge ratios) computed by the set combination circuitry 305 and the merge ratio estimation circuitry 215 from the panel audience data can be used by the example reach calculation circuitry 220 of the population reach determination circuitry 120 of FIG. 3 to estimate each nested/hierarchical level's deduplicated audience. The unknown, deduplicated census audiences for the merged unions of events at the different nested/hierarchical levels are represented by the variables $N_i$ herein, with subscripts to avoid ambiguity between the different merged unions of events. In this example, the estimated values for the unknown, deduplicated census audiences for the merged unions of events at the different nested/hierarchical levels are rounded for clarity.

Continuing with this example, the set combination circuitry 305 instructs, controls or otherwise causes the reach calculation circuitry 220 estimate the deduplicated census audiences for the merged unions of events at the different nested/hierarchical levels based on the Fréchet ratio formula of Equation 22 using the Fréchet ratios calculated from the panel data for the given merged unions of events and the lower and upper bounds calculated for the given merged unions of events according to Equation 16 as follows:

For events {1}, {2}, {3} merging to merged event A={1, 2, 3}, the set combination circuitry 305 instructs the reach calculation circuitry 220 to compute the deduplicated census audience for that merged event A as $N_1$=486+0.76 (1329−486)=1127.

For events {4}, {5} merging to merged event B={4, 5}, the set combination circuitry 305 instructs the reach calculation circuitry 220 to compute the deduplicated census audience for that merged event B as $N_2$=823+0.428571 (1615−823)=1162.

For merged event A={1, 2, 3}, merged event B={4, 5} and event {6} merging to merged event C={1, 2, 3, 4, 5, 6}, the set combination circuitry 305 instructs the reach calculation circuitry 220 to compute the deduplicated census audience for that merged event C as $N_3$=1162+0.727273 (3245−1162) =2677.

Thus, in this example, the reach calculation circuitry 220 predicts 2,677 total deduplicated audience across the six events within the census.

In an important distinction and clarification, the deduplicated census audience estimated for last nested/hierarchical event in the preceding example uses the estimates for the earlier, intermediate merged events. In that way, the population reach determination circuitry 120 uses knowledge of lower level unions to bound higher level unions. For example, the union events {1, 2, 3} has 1,127 people, the union of events{4, 5} has 1,162 people. Those two estimates, along with event {6} being 956 people can be used by the reach calculation circuitry 220 to evaluate Fréchet inequality directly for the union of the three sets (based on LB=max[1127, 1162, 956]=1162 and UB=Min[10000, 1127+1162+956]=3245.)

The preceding example can be compared to another example that ignores all lower level sub-unions and prior knowledge is limited to noting that 85 people were in the overall deduplicated audience for the panel. In such an example:

The merge ratio estimation circuitry 215 estimates the Fréchet ratio for the panel according to Equation 18 as r=(85−45)/(100−45)=0.727273.

Then the reach calculation circuitry 220 then estimates the deduplicated audience for the census according to Equation 22 as N=956+0.727273 (3900−956)=3,098 people.

Notice the values within the Fréchet ratio formula for total audience within census is different from the preceding example. In this latter case, the events {1}, {2}, ..., {6} are being merged individually into the overall merged event C={1, 2, 3, 4, 5, 6}. Hence the lower bound is LB=max[363, 480, 486, 792, 823, 956]=956 and the upper bound is UB=Min[10000, 363+ ... +956]=3900.

In summary, the use of nested Fréchet ratios (also referred to as nested merge ratios) helps take further correlations and dependencies into account when lower level sub-unions are known. When estimating the census level unions, the estimates for the lower level unions are used directly within the Fréchet inequalities and ratios for estimating higher level unions. This produces a nested structure in which lower level union estimates are nested within the methodology for higher level union estimates.

In the example described above, the estimate for total deduplicated audience went from 3,098 people to 2,677 when the knowledge of lower-level unions was incorporated from the panel. The number of levels is not limited to one or two, but can be any number as long the union property restriction (e.g., that at all levels the indices of events being merged must be mutually exclusive between the sets) is maintained throughout. With that restriction all estimates are logically consistent within themselves. The revised estimated total audience need not be smaller than the original overall Fréchet ratio estimate, it could be higher or lower depending on the sub-union structures and values seen in the panel.

Although the nested/hierarchical Fréchet ratio methodology is disclosed above in the context of audience estimates between media events, such as website visits or television viewership, the methodology can be used to implement deduplication among any collection of items which can belong to multiple sets. Also, for the purpose of this disclosure, the labels of audience and population were used for illustration of the technique, and the disclosure is not limited thereto.

In some examples, the population reach determination circuitry 120 of FIGS. 2 and/or 3 includes means for estimating a merge ratio. For example, the means for estimating the merge ratio may be implemented by example merge ratio estimation circuitry 215. In some examples, the merge ratio estimation circuitry 215 may be implemented by machine executable instructions such as that implemented by at least blocks 410, 505, 510, 515, 520, 525, 720, 805, 810, 815, 820 and/or 825 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the merge ratio estimation circuitry 215 is implemented by other hardware logic circuitry, hardware implemented state machines, and/or any other combination of hardware, software, and/or firmware. For example, the merge ratio estimation circuitry 215 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the population reach determination circuitry 120 of FIGS. 2 and/or 3 includes means for outputting a reach value. For example, the means for outputting the reach value may be implemented by example reach calculation circuitry 220. In some examples, the reach calculation circuitry 220 may be implemented by machine executable instructions such as that implemented by at least blocks 420, 425, 730 and/or 735 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the reach calculation circuitry 220 is implemented by other hardware logic circuitry, hardware implemented state machines, and/or any other combination of hardware, software, and/or firmware. For example, the reach calculation circuitry 220 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the population reach determination circuitry 120 of FIGS. 2 and/or 3 includes means identifying a merged union of media events for which a deduplicated census audience value is to be determined. For example, the means for identifying a merged union of media events for which a deduplicated census audience value is to be determined may be implemented by example set combination circuitry 305. In some examples, the set combination circuitry 305 may be implemented by machine executable instructions such as that implemented by at least blocks 710 and/or 715 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the set combination circuitry 305 is implemented by other hardware logic circuitry, hardware implemented state machines, and/or any other combination of hardware, software, and/or firmware. For example, the set combination circuitry 305 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the population reach determination circuitry 120 if FIG. 1 is illustrated in FIGS. 2-3, one or more of the elements, processes, and/or devices illustrated in FIGS. 2-3 may be combined, divided, re-arranged, omitted, eliminated, and/or implemented in any other way. Further, the example census data interface circuitry 205, the example panel data interface circuitry 210, the example merge ratio estimation circuitry 215, the example reach calculation circuitry 220, the example set combination circuitry 305 and/or, more generally, the example population reach determination circuitry 120 of FIGS. 2-3, may be implemented by hardware, software, firmware, and/or any combination of hardware, software, and/or firmware. Thus, for example, any of the example census data interface circuitry 205, the example panel data interface circuitry 210, the example merge ratio estimation circuitry 215, the example reach calculation circuitry 220, the example set combination circuitry 305 and/or, more generally, the example population reach determination circuitry 120 could be implemented by processor circuitry, analog circuit(s), digital circuit(s), logic circuit(s), programmable processor(s), programmable microcontroller (s), graphics processing unit(s) (GPU(s)), digital signal processor(s) (DSP(s)), application specific integrated circuit(s) (ASIC(s)), programmable logic device(s) (PLD(s)), field programmable gate arrays (FPGAs) and/or field programmable logic device(s) (FPLD(s)) such as Field Programmable Gate Arrays (FPGAs). When reading any of the apparatus or system claims of this patent to cover a purely software and/or firmware implementation, at least one of the example population reach determination circuitry 120, the example census data interface circuitry 205, the example panel data interface circuitry 210, the example merge ratio estimation circuitry 215, the example reach calculation circuitry 220 and/or the example set combination circuitry 305 is/are hereby expressly defined to include a non-transitory computer readable storage device or storage disk such as a memory, a digital versatile disk (DVD), a compact disk (CD), a Blu-ray disk, etc. including the software and/or firmware. Further still, the example population reach determination circuitry 120 may include one or more elements, processes and/or devices in addition to, or instead of, those illustrated in FIGS. 1-3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic circuitry, machine readable instructions, hardware implemented state machines, and/or any combination thereof for implementing the population reach determination circuitry 120 of FIGS. 1-3 are shown in FIGS. 4-8. In these examples, the machine readable instructions may be one or more executable programs or portion(s) of an executable program for execution by a computer processor and/or processor circuitry, such as the processor circuitry 912 shown in the example processor platform 900 discussed below in connection with FIG. 9 and/or the example processor circuitry discussed below in connection with FIGS. 10 and/or 11. The one or more programs, or portion(s) thereof, may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program or programs and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program(s) is(are) described with reference to the flowcharts illustrated in FIGS. 4-8, many other methods of implementing the example population reach determination circuitry 120 may alternatively be used. For example, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4-8 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media. Also, as used herein, the terms "computer readable" and "machine readable" are considered equivalent unless indicated otherwise.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 4:
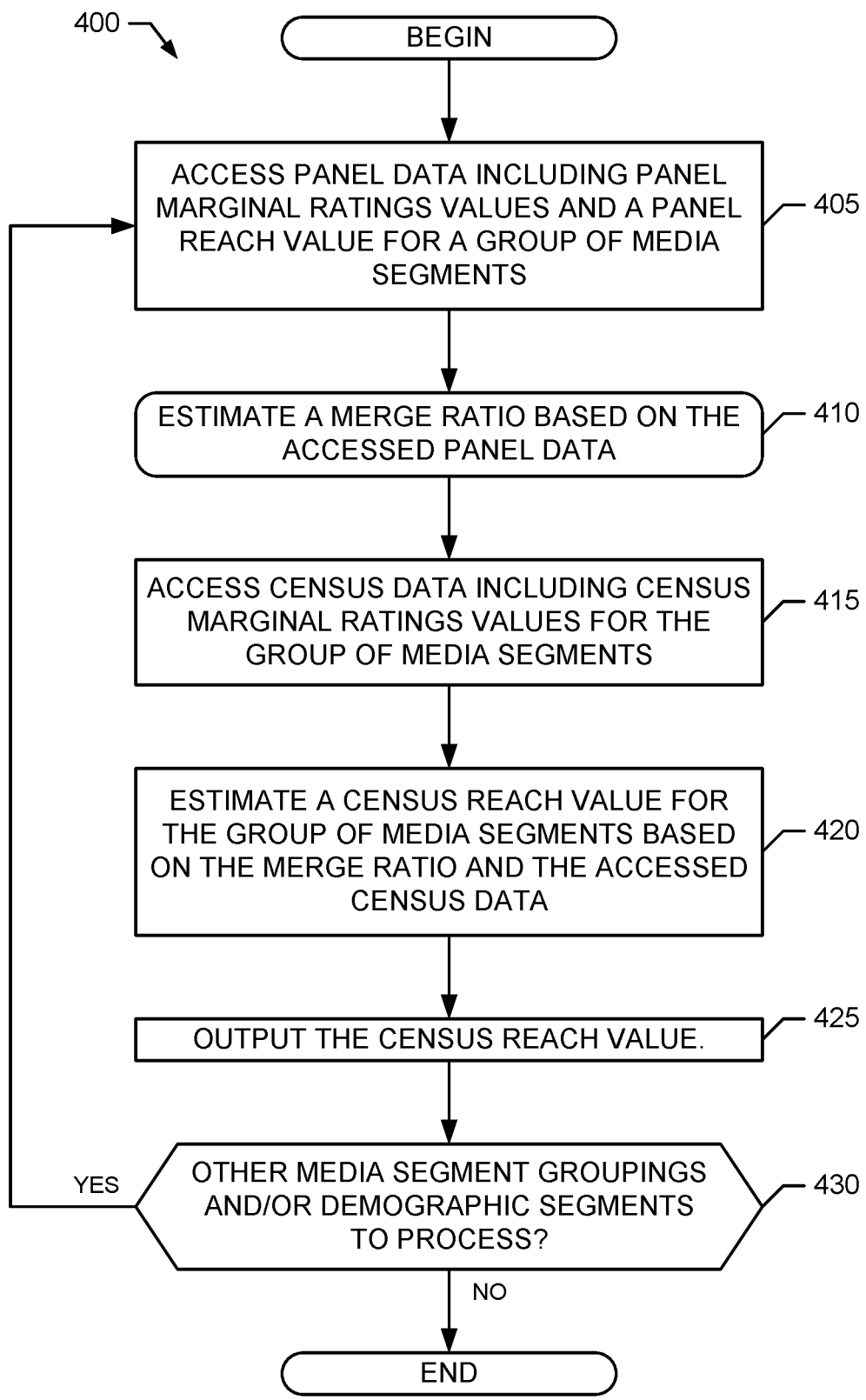
FIGS. 4, 5 and 6 are flowcharts representative of example machine readable instructions that may be executed by example processor circuitry to implement the population reach determination circuitry of FIGS. 1, 2 and/or 3.

FIG. 4 is a flowchart representative of example machine readable instructions and/or example operations 400 that may be executed and/or instantiated by processor circuitry to implement the example population reach determination circuitry 120 of FIGS. 1, 2 and/or 3. With reference to the preceding figures and associated written descriptions, the machine readable instructions and/or operations 400 of FIG. 4 begin at block 405, at which the example panel data interface circuitry 210 of the population reach determination circuitry 120 accesses the panelist data storage 118 to obtain panel data including panel marginal ratings values and a panel marginal reach value for a group of media segments, as described above. At block 410, the example merge ratio estimation circuitry 215 of the population reach determination circuitry 120 estimates, as described above, a merge ratio based on the panel data accessed at block 405. For example, the merge ratio estimation circuitry 215 may estimate the merge ratio according to Equation 8, as described above. Example machine readable instructions and/or example operations that may be executed and/or instantiated by processor circuitry to implement the processing at block 410 are illustrated in FIG. 5, which is described in further detail below.

At block 415, the example census data interface circuitry 205 of the population reach determination circuitry 120 accesses the RPD audience storage 116 to obtain census marginal ratings values for the group of media segments, as described above. At block 420, the example reach calculation circuitry 220 of the population reach determination circuitry 120 estimates, as described above, a census reach value for the union of the group of media segments based on the merge ratio determined at block 410 and the census marginal ratings values. For example, the reach calculation circuitry 220 may estimate the census reach value according to Equation 12, as described above. At block 425, the reach calculation circuitry 220 outputs the estimated census reach value. At block 430, the population reach determination circuitry 120 determines whether census reach values for other media segment groupings and/or demographic segments are to be estimated. If yes, then processing returns to block 405. Otherwise, the machine readable instructions and/or operations 400 end.

Figure 5:
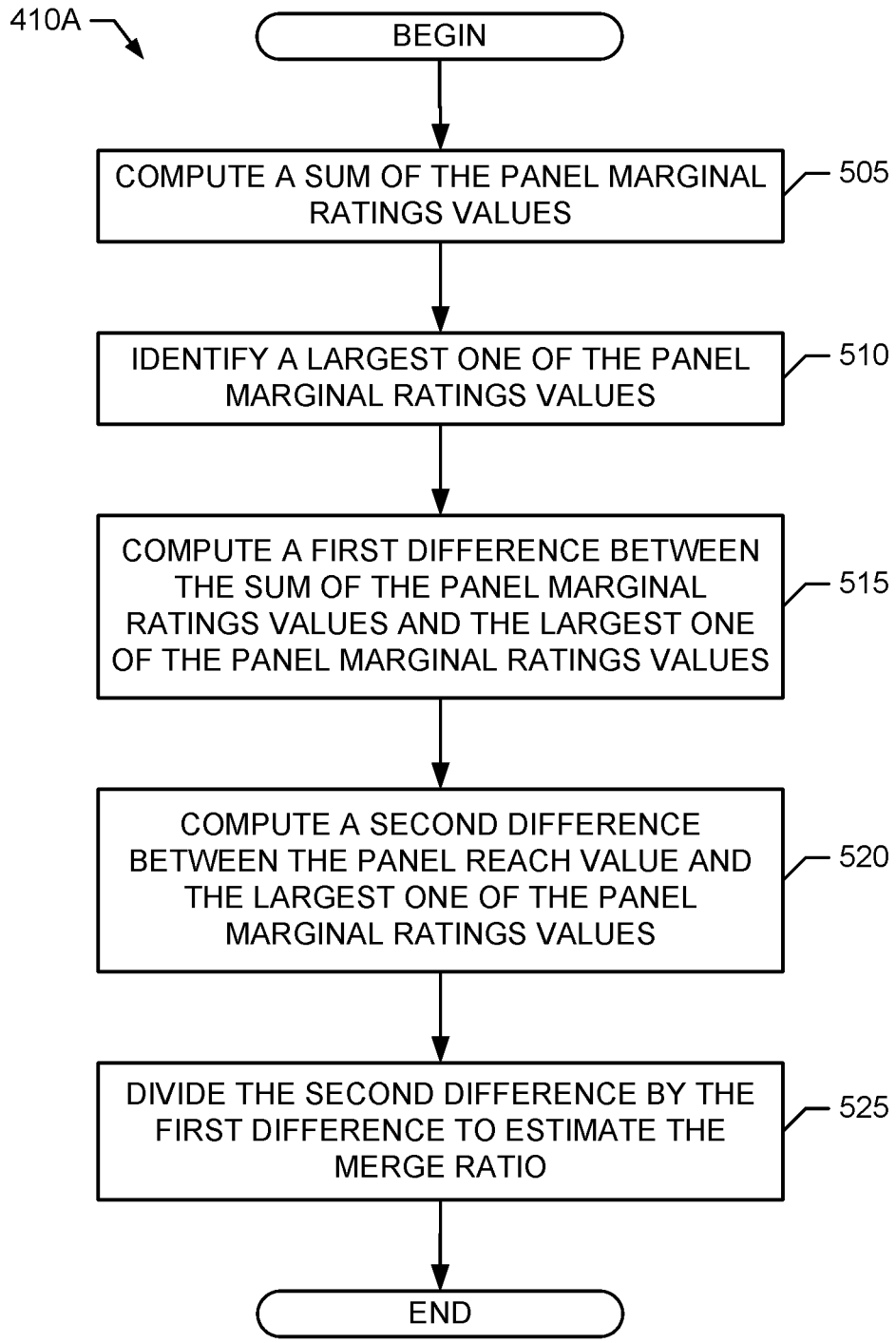

FIG. 5 is a flowchart representative of example machine readable instructions and/or example operations 410A that may be executed and/or instantiated by processor circuitry to implement the processing at block 410 of FIG. 4. With reference to the preceding figures and associated written descriptions, the machine readable instructions and/or operations 410A of FIG. 5 begin at block 505, at which the merge ratio estimation circuitry 215 of the population reach determination circuitry 120 computes a sum of the panel marginal ratings values, as described above. At block 510, the merge ratio estimation circuitry 215 selects a largest one of the panel marginal ratings values. At block 515, the merge ratio estimation circuitry 215 computes a first difference between the sum of the panel marginal ratings values and the largest one of the panel marginal ratings values. At block 520, the merge ratio estimation circuitry 215 computes a second difference the panel reach value and the largest one of the panel marginal ratings values. At block 525, the merge ratio estimation circuitry 215 divides the second difference by the first difference to estimate the merge ratio. The machine readable instructions and/or operations 410A then end.

Figure 6:
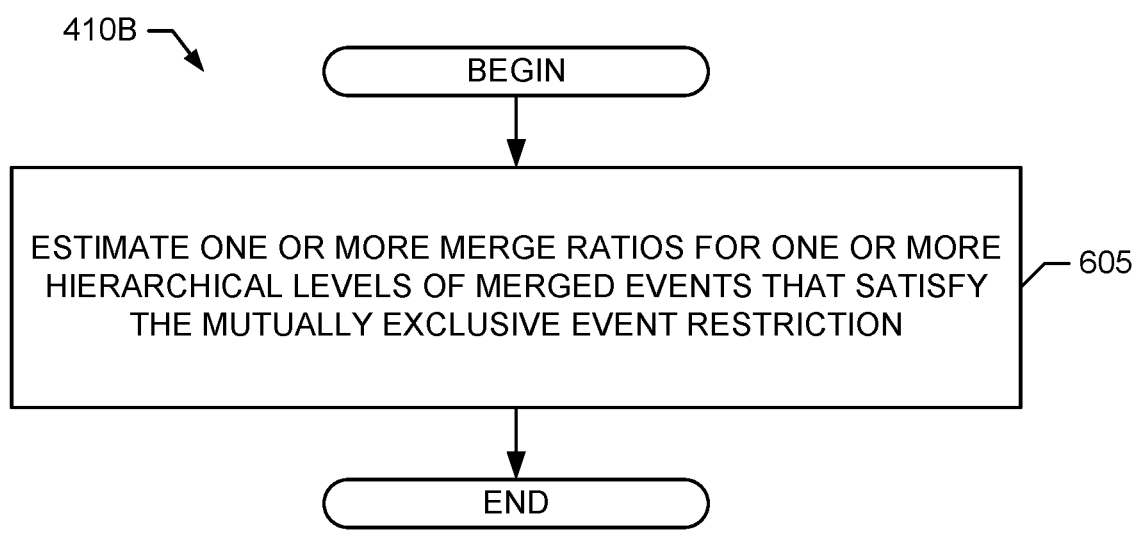

FIG. 6 is a flowchart representative of example machine readable instructions and/or example operations 410B that may be executed and/or instantiated by processor circuitry to implement the processing at block 410 of FIG. 4. With reference to the preceding figures and associated written descriptions, the machine readable instructions and/or operations 410B of FIG. 6 begin at block 605, at which the merge ratio estimation circuitry 215 of the population reach determination circuitry 120 estimates one or more merge ratio (e.g., nested Fréchet ratios) for one or more hierarchical levels of merged events that satisfy the mutually exclusive event restriction, as described above and in further detail below. The machine readable instructions and/or operations 410B then end.

Figure 7:
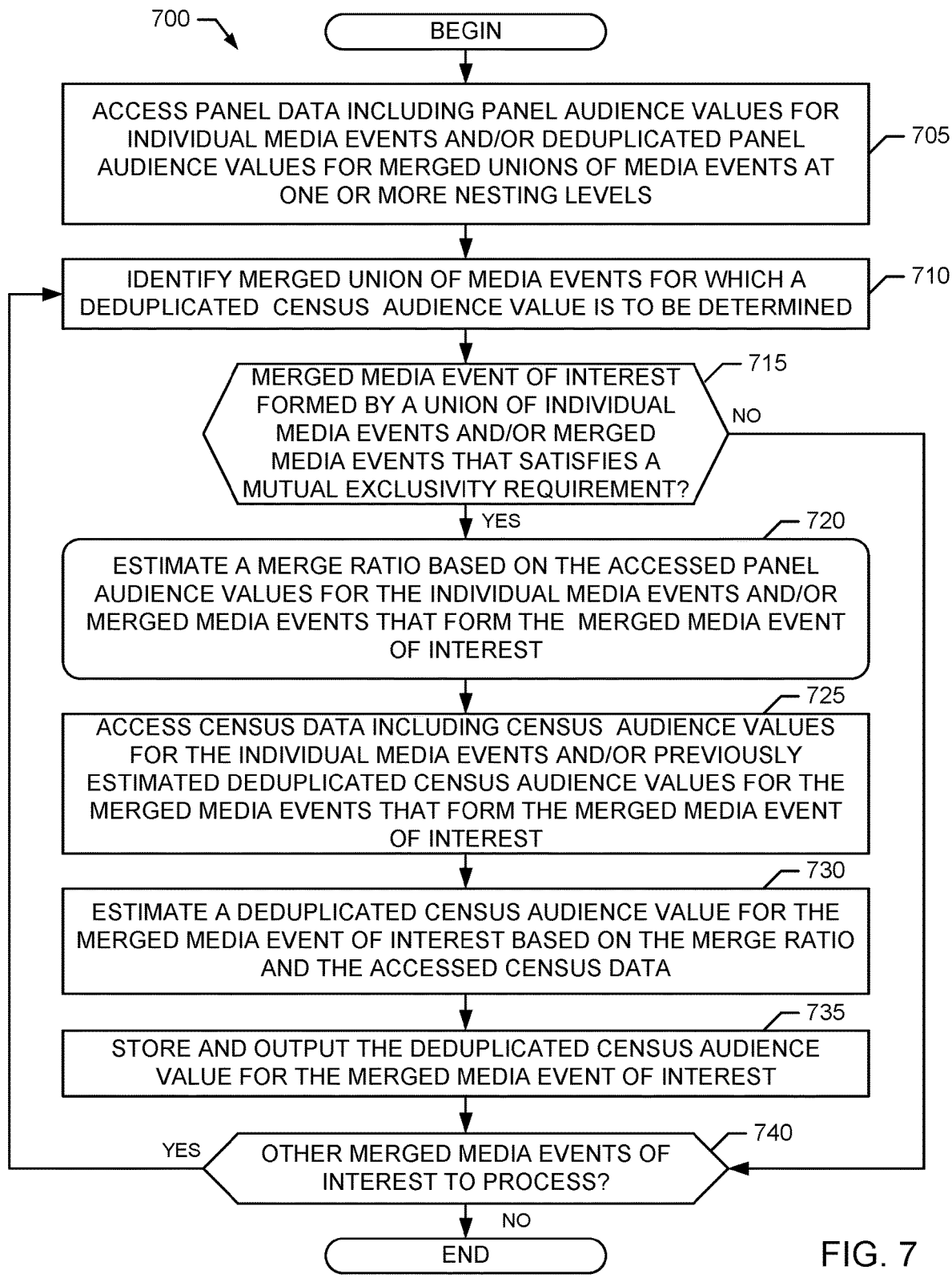
FIGS. 7 and 8 are flowcharts representative of example machine readable instructions that may be executed by example processor circuitry to implement the population reach determination circuitry of FIGS. 1 and/or 3.

FIG. 7 is a flowchart representative of example machine readable instructions and/or example operations 700 that may be executed and/or instantiated by processor circuitry to implement the example population reach determination circuitry 120 of FIGS. 1 and/or 3. With reference to the preceding figures and associated written descriptions, the machine readable instructions and/or operations 700 of FIG. 7 begin at block 705, at which the example panel data interface circuitry 210 of the population reach determination circuitry 120 of FIG. 3 accesses the panelist data storage 118 to obtain panel data including individual panel audience values for individual media events and/or deduplicated panel audience values for merged unions of media events at one or more nesting levels, as described above. For example, and with reference to the example described above in connection with FIG. 3, at block 705 the panel data interface circuitry 210 may access the panelist data storage 118 to obtain individual panel audience values of $\{10, 15, 16, 21, 21, 45\}$ across 6 events indexed $\{1\}$, $\{2\}$, $\{3\}$, $\{4\}$, $\{5\}$ and $\{6\}$, a panel UE of 100 panelist, a deduplicated panel audience value of 35 panelists for merged event A=$\{1, 2, 3\}$=union of events$\{1\}$, $\{2\}$, $\{3\}$, a deduplicated panel audience value of 30 panelists for merged event B=$\{4, 5\}$=union of events $\{4\}$, $\{5\}$, and a deduplicated panel audience value of 30 panelists for merged event C=$\{1, 2, 3, 4, 5, 6\}$=union of events $\{1\}$, $\{2\}$, $\{3\}$, $\{4\}$, $\{5\}$, $\{6\}$.

At block 710, the example set combination circuitry 305 of the population reach determination circuitry 120 of FIG. 3 identifies a merged union of media events for which a deduplicated census audience value is to be determined. For example, and with reference to the example described above in connection with FIG. 3, at block 710 the set combination circuitry 305 can identify the merged event C=$\{1, 2, 3, 4, 5, 6\}$ as the merged media event of interest, and further identifies, based on the panelist data obtained at block 705, that the merged media event of interest can be formed by the union of the merged media event A=$\{1, 2, 3\}$, the merged media event B=$\{4, 5\}$ and the individual event $\{6\}$ for which panel audience values were obtained.

At block 715, the set combination circuitry 305 determines whether the merged media event of interest identified at block 715 is formed by a union of individual media events and/or merged media events that satisfies the mutual exclusivity condition described above. As described above, the mutual exclusivity condition specifies that the individual media events and/or merged media events whose union forms the merged media event of interest must be mutually exclusive relative to each other such that none of the individual media events and/or merged media events share a common event. In the preceding example, the merged media event A=$\{1, 2, 3\}$, the merged media event B=$\{4, 5\}$ and the individual event $\{6\}$ are mutually exclusive because they do not share a common media event. However, if the merged event of interest C={1, 2, 3, 4, 5, 6} was formed by the union of merged event E={1, 2, 3}, merged event F={3, 4, 5} and the individual event {6}, that union would not satisfy the mutual exclusivity condition because the individual event {3} is common to both the merged event E and the merged event F.

Figure 8:
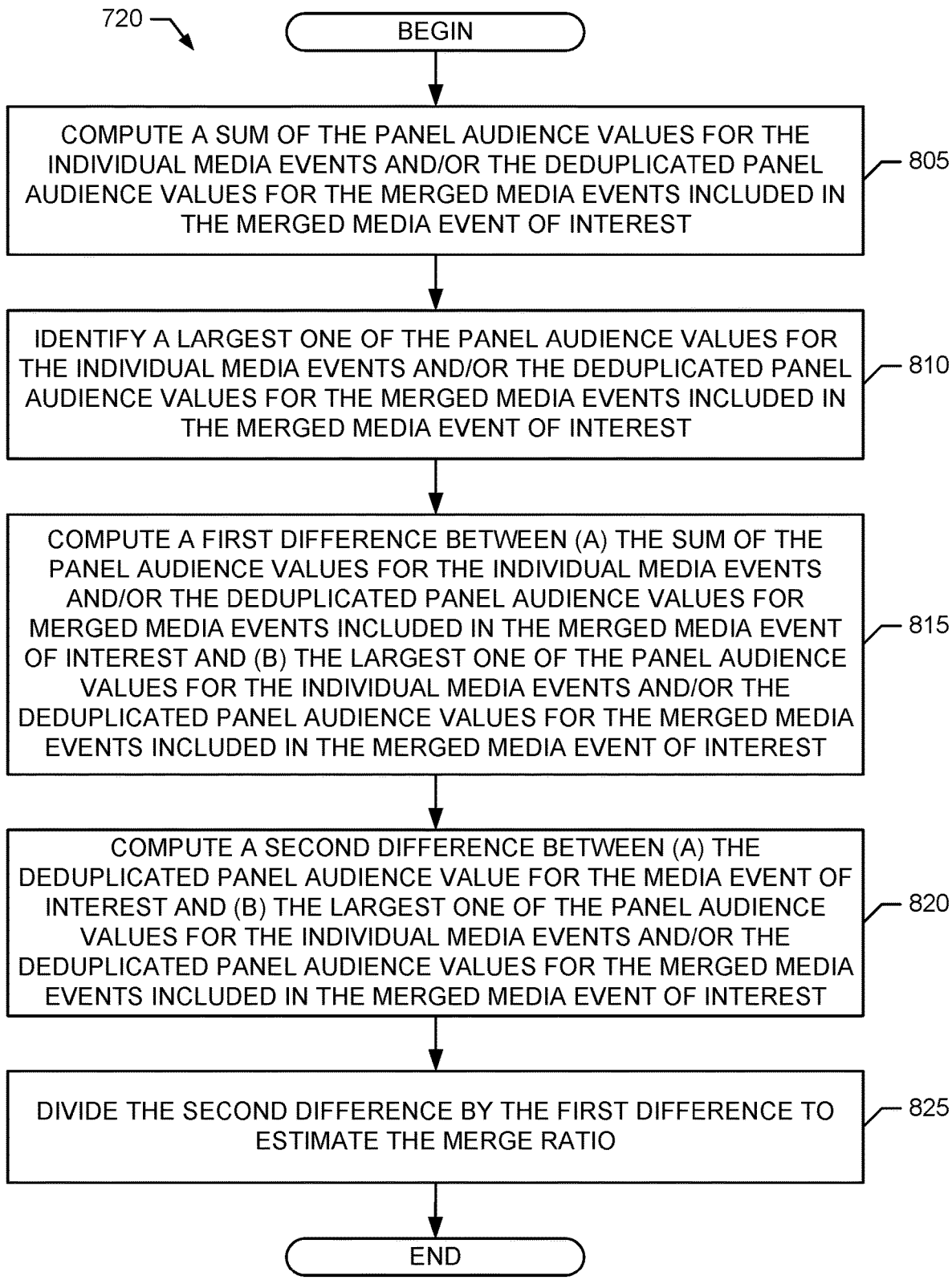

If the merged media event of interest satisfies the mutual exclusivity condition (e.g., the YES branch out of block 715), then at block 720, the example merge ratio estimation circuitry 215 of the population reach determination circuitry 120 estimates, as described above, a merge ratio based on the accessed panel audience values for the individual media events and/or the merged media events that form the media event of interest. For example, the merge ratio estimation circuitry 215 may estimate the merge ratio according to Equation 18, as described above. Example machine readable instructions and/or example operations that may be executed and/or instantiated by processor circuitry to implement the processing at block 720 are illustrated in FIG. 8, which is described in further detail below.

At block 725, the example census data interface circuitry 205 of the population reach determination circuitry 120 accesses the RPD audience storage 116 to obtain census audience values for the individual media events and/or previously estimated deduplicated census audience values for the merged media events whose union forms the media event of interest. For example, and with reference to the example described above in connection with FIG. 3, at block 725 the census data interface circuitry 205 may access the RPD audience storage 116 to obtain the census audience value of 956 for individual media event {6}, a census UE of 10,000 people, a previously estimated deduplicated census audience value of 1127 for the merged event A={1, 2, 3}, and a previously estimated deduplicated census audience value of 1162 for the merged event B={4, 5}. In this example, the previously estimated deduplicated census audience value of 1127 for the merged event A={1, 2, 3} was computed in a previous iteration of the machine readable instructions and/or operations 700 during which the merged media event of interest was A={1, 2, 3}, and was identified as being formed by the union of events {1}, {2}, {3}. Likewise, in this example, the previously estimated deduplicated census audience value of 1162 for the merged event B={4, 5} was computed in a previous iteration of the machine readable instructions and/or operations 700 during which the merged media event of interest was B={4, 5}, and was identified as being formed by the union of events {4}, {5}.

At block 730, the example reach calculation circuitry 220 of the population reach determination circuitry 120 estimates, as described above, a deduplicated census audience value for the merged media event of interest based on the merge ratio determined at block 720 and the census data accessed at block 725. For example, the reach calculation circuitry 220 may estimate the deduplicated census audience value according to Equation 22, as described above. For example, and with reference to the example described above in connection with FIG. 3, at block 730, the merge ratio determined at block 720 may be 0.727273, the lower bound of the Fréchet inequalities may be determined by the reach calculation circuitry 220 to be LB=max[1127, 1162, 956] =1162, the upper bound of the Fréchet inequalities may be determined by the reach calculation circuitry 220 to be UB=Min[10000, 1127+1162+956]=3245, and the reach calculation circuitry 220 may determine the deduplicated census audience value for the merged event of interest C={1, 2, 3, 4, 5, 6} to be 1162+0.727273 (3245−1162)=2677 people.

At block 735, the reach calculation circuitry 220 outputs the estimated deduplicated census audience value for the merged event of interest. At block 735, the reach calculation circuitry 220 also stores the estimated deduplicated census audience value for the merged event of interest in the RPD audience storage 116 for use during a subsequent iteration of the machine readable instructions and/or operations 700.

At block 740, the set combination circuitry 305 determines whether deduplicated census audience values are to be estimated for other merged media events of interest. If yes, then processing returns to block 710. Otherwise, the machine readable instructions and/or operations 700 end. Returning to block 715, if the merged media event of interest does not satisfy the mutual exclusivity condition (e.g., the NO branch out of block 715), processing also proceeds to block 740. Thus, if merged media event of interest does not satisfy the mutual exclusivity condition, estimation of a deduplicated audience for the media of interest may be skipped. In some such examples, the set combination circuitry 305 may output an instruction, signal, etc., to indicate a failure or error condition has occurred and/or cause a downstream audience measurement system to halt, skip, etc., audience measurement processing associated with the merged media event in response to the mutual exclusivity condition not being satisfied. In some examples, the set combination circuitry 305 may identify whether the merged media event of interest may be formed by a different union of individual media events and/or merged media events that does satisfy the mutual exclusivity condition. If so, the set combination circuitry 305 may cause processing to return to block 710 to enable estimate of the deduplicated census audience based on the different union of individual media events and/or merged media events that does satisfy the mutual exclusivity condition.

FIG. 8 is a flowchart representative of example machine readable instructions and/or example operations 720 that may be executed and/or instantiated by processor circuitry to implement the processing at block 720 of FIG. 7. With reference to the preceding figures and associated written descriptions, the machine readable instructions and/or operations 720 of FIG. 8 begin at block 805, at which the merge ratio estimation circuitry 215 of the population reach determination circuitry 120 computes, as described above, a sum of the panel audience values for the individual media events and/or the deduplicated panel audience values for the merged media events included in the merged media event of interest. For example, and with reference to the example described above in connection with FIG. 3, the merge ratio estimation circuitry 215 may compute the sum of the panel audience value of 45 panelists for individual media event {6}, the panel audience value of 35 panelists for the merged event A={1, 2, 3}, and the panel audience value of 30 panelists for the merged event B={4, 5}, which yields a sum of 110 panelists. However, the sum cannot be larger than the panelist UE of 100, so the merge ratio estimation circuitry 215 limits the sum to be 100 in this example.

At block 810, the merge ratio estimation circuitry 215 selects a largest one of the panel audience values for the individual media events and/or the merged media events included in the merged media event of interest. For example, and with reference to the example described above in connection with FIG. 3, the merge ratio estimation circuitry 215 may determine the largest one of the panel audience values to be the largest of the panel audience value of 45 panelists for individual media event {6}, the panel audience value of 35 panelists for the merged event A={1, 2, 3}, and the panel audience value of 30 panelists for the merged event B={4, 5}, which yields a largest value of 45.

At block 815, the merge ratio estimation circuitry 215 computes a first difference between the sum determined at block 805 and the largest one of the panel audience values determined at block 810. For example, and with reference to the example described above in connection with FIG. 3, the merge ratio estimation circuitry 215 may determine the first difference to be (100−45)=55.

At block 820, the merge ratio estimation circuitry 215 computes a second difference the deduplicated panel audience value for the merged media event of interest and the largest one of the panel audience values determined at block 810. For example, and with reference to the example described above in connection with FIG. 3, at block 820 the merge ratio estimation circuitry 215 may determine the second difference to be (85−45)=40, where 85 is the deduplicated panel audience value obtained for the merged media event of interest C={1, 2, 3, 4, 5, 6}.

At block 825, the merge ratio estimation circuitry 215 divides the second difference by the first difference to estimate the merge ratio. For example, and with reference to the example described above in connection with FIG. 3, at block 825 the merge ratio estimation circuitry 215 may determine the merge ratio to be r=40/55=0.727273. The machine readable instructions and/or operations 720 then end.

Figure 9:
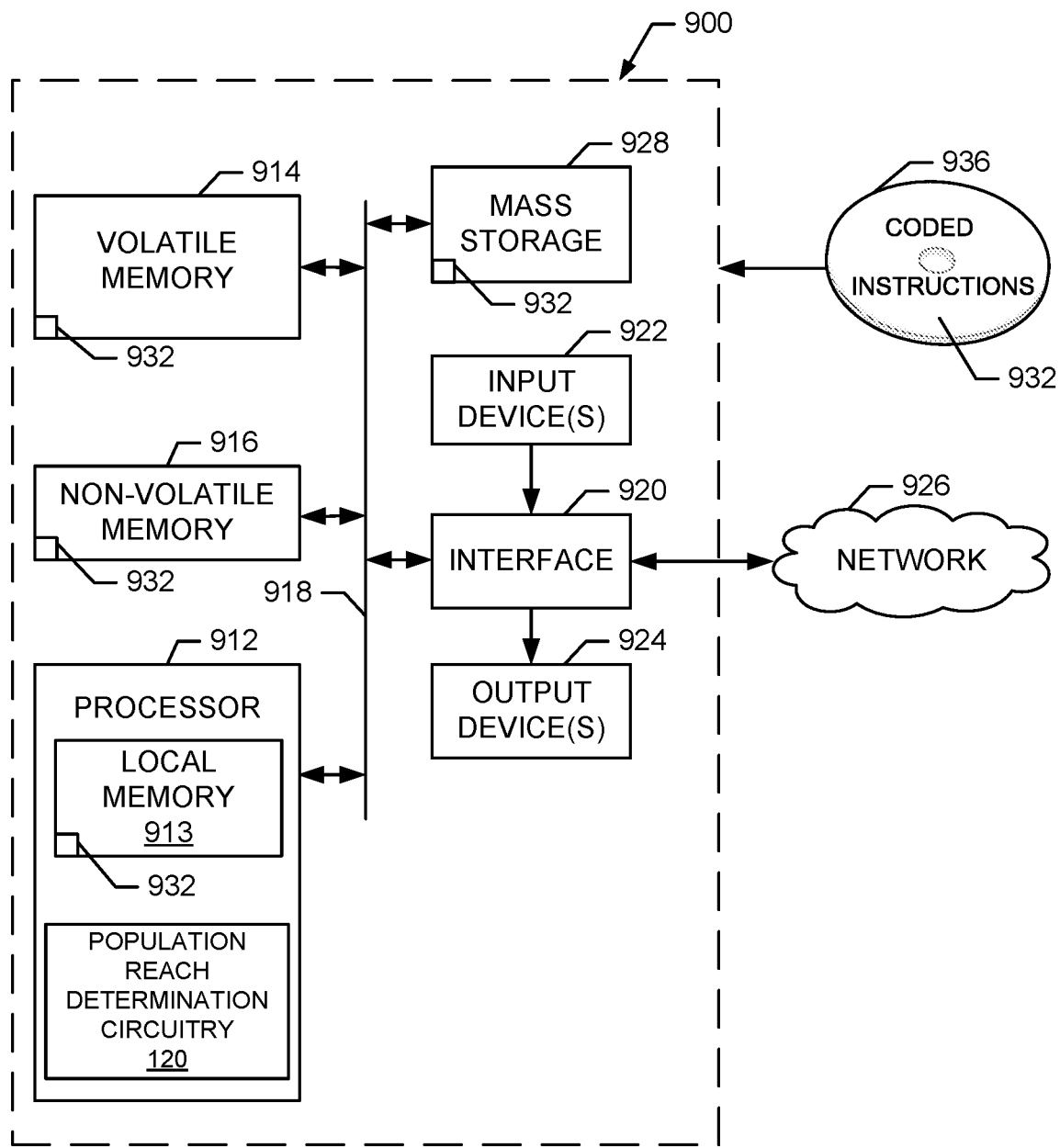
FIG. 9 is a block diagram of an example processor platform including processor circuitry structured to execute the example machine readable instructions of FIGS. 4, 5, 6, 7 and/or 8 to implement the example population reach determination circuitry of FIGS. 1, 2 and/or 3.

FIG. 9 is a block diagram of an example processor platform 900 structured to execute and/or instantiate the machine readable instructions and/or operations of FIGS. 4, 5, 6, 7 and/or 8 to implement the example population reach determination circuitry 120 of FIGS. 1, 2 and/or 3. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, etc., or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor 912 may be a semiconductor based (e.g., silicon based) device. In this example, the processor 912 implements the population reach determination circuitry 120 and, thus, may implement one or more of the example census data interface circuitry 205, the example panel data interface circuitry 210, the example merge ratio estimation circuitry 215, the example reach calculation circuitry 220 and/or the set combination circuitry 305.

The processor 912 of the illustrated example includes a local memory 913 (e.g., a cache, registers, etc.). The processor circuitry 912 of the illustrated example is in communication with a main memory including a volatile memory 914 and a non-volatile memory 916 via a link 918. The link 918 may be implemented by a bus, one or more point-to-point connections, etc., or a combination thereof. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 922 are connected to the interface circuitry 920. The input device(s) 922 permit(s) a user to enter data and/or commands into the processor circuitry 912. The input device(s) can be implemented by, for example, an audio sensor, a microphone, a camera (still or video), a keyboard, a button, a mouse, a touchscreen, a track-pad, a trackball, a trackbar (such as an isopoint device), a voice recognition system and/or any other human-machine interface. Also, many systems, such as the processor platform 900, can allow the user to control the computer system and provide data to the computer using physical gestures, such as, but not limited to, hand or body movements, facial expressions, and face recognition.

One or more output devices 924 are also connected to the interface circuitry 920 of the illustrated example. The output devices 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer and/or speakers(s). The interface circuitry 920 of the illustrated example, thus, typically includes a graphics driver card, a graphics driver chip and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be via, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 932 which may be implemented by the machine readable instructions of FIGS. 4, 5, 6, 7 and/or 8 may be stored in the mass storage device 928, in the volatile memory 914, in the non-volatile memory 916, in the local memory 913 and/or on a removable non-transitory computer readable storage medium, such as a CD or DVD 936.

Figure 10:
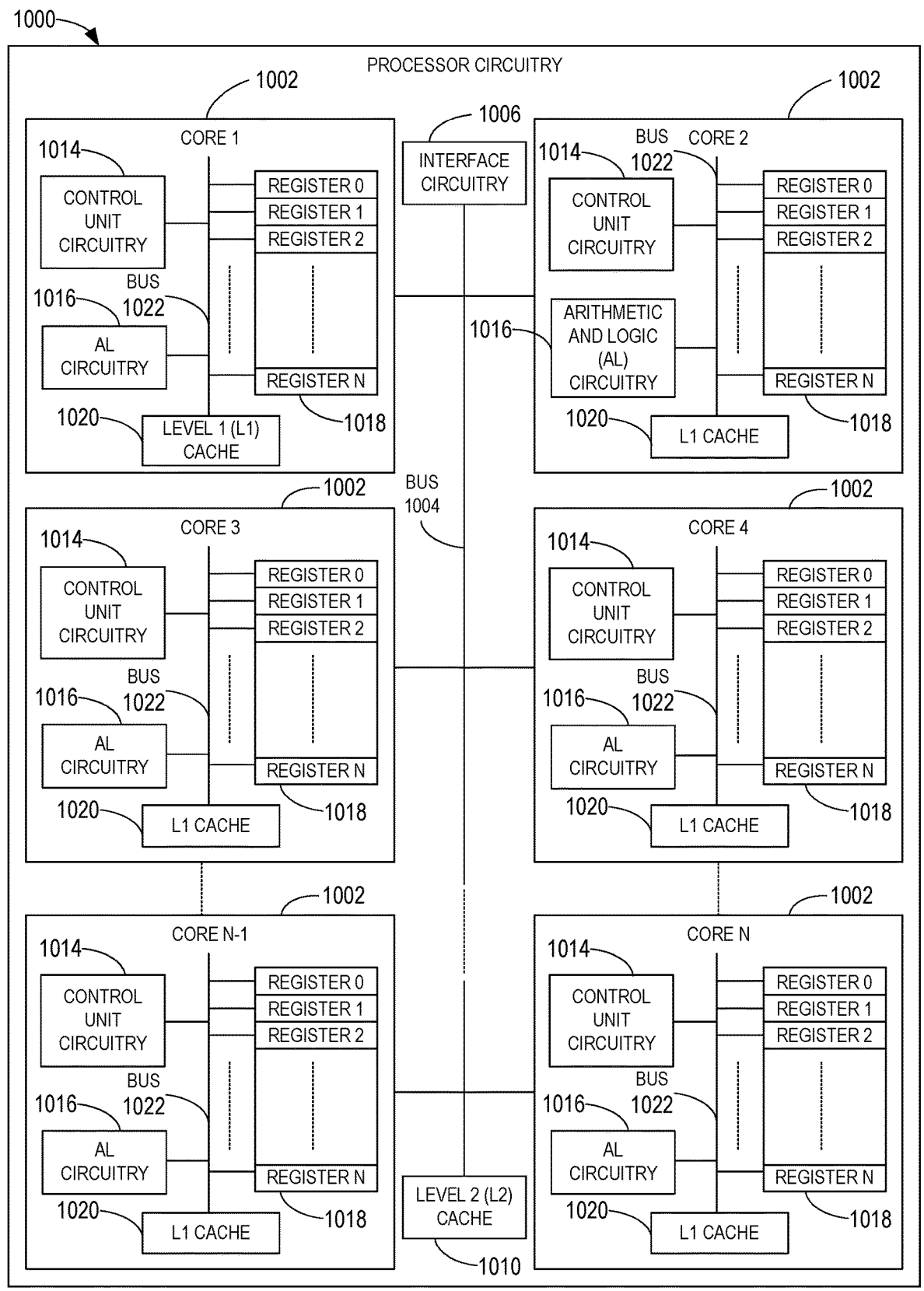
FIG. 10 is a block diagram of an example implementation of the processor circuitry of FIG. 9.

FIG. 10 is a block diagram of an example implementation of the processor circuitry 912 of FIG. 9. In this example, the processor circuitry 912 of FIG. 9 is implemented by a microprocessor 1000. For example, the microprocessor 1000 may implement multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine readable instructions and/or operations represented by the flowcharts of FIGS. 4, 5, 6, 7 and/or 8.

The cores 1002 may communicate by an example bus 1004. In some examples, the bus 1004 may implement a communication bus to effectuate communication associated with one(s) of the cores 1002. For example, the bus 1004 may implement at least one of an Inter-Integrated Circuit (I2C) bus, a Serial Peripheral Interface (SPI) bus, a PCI bus, or a PCIe bus. Additionally or alternatively, the bus 1004 may implement any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2_cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the L1 cache 1020, and an example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating point operations. In yet other examples, the AL circuitry 1016 may include first AL circuitry that performs integer based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register (s), flag register(s), segment register(s), machine specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure including distributed throughout the core 1002 to shorten access time. The bus 1020 may implement at least one of an I2C bus, a SPI bus, a PCI bus, or a PCIe bus.

Figure 11:
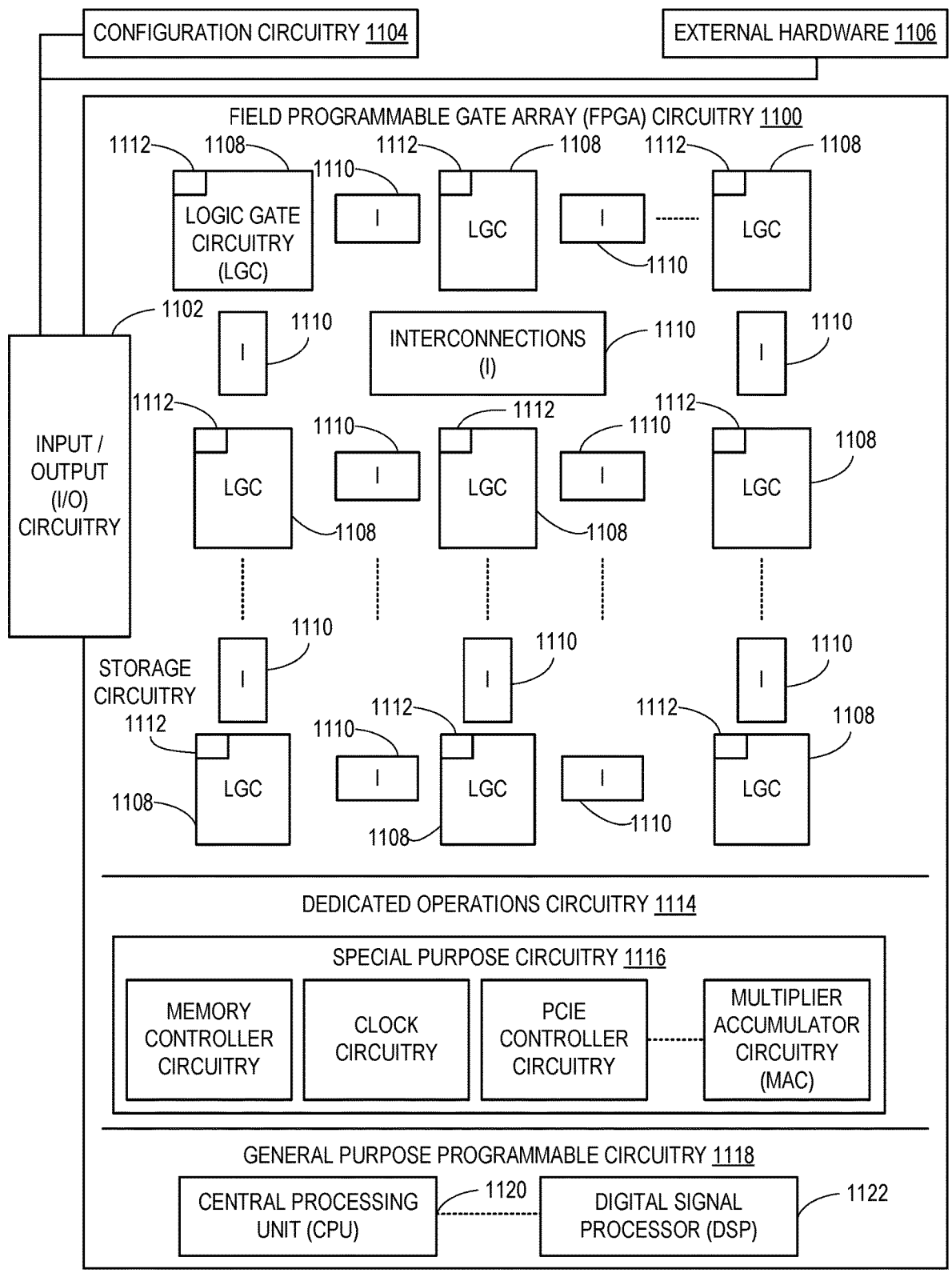
FIG. 11 is a block diagram of another example implementation of the processor circuitry of FIG. 9.

Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry FIG. 11 is a block diagram of another example implementation of the processor circuitry 912 of FIG. 9. In this example, the processor circuitry 912 is implemented by FPGA circuitry 1100. The FPGA circuitry 1100 can be used, for example, to perform operations that could otherwise be performed by the example microprocessor 1000 of FIG. 10 executing corresponding machine readable instructions. However, once configured, the FPGA circuitry 1100 instantiates the machine readable instructions in hardware and, thus, can often execute the operations faster than they could be performed by a general purpose microprocessor executing the corresponding software.

More specifically, in contrast to the microprocessor 1100 of FIG. 10 described above (which is a general purpose device that may be programmed to execute some or all of the machine readable instructions represented by the flowchart of FIGS. 4, 5, 6, 7 and/or 8, but whose interconnections and logic circuitry are fixed once fabricated), the FPGA circuitry 1100 of the example of FIG. 11 includes interconnections and logic circuitry that may be configured and/or interconnected in different ways after fabrication to instantiate, for example, some or all of the machine readable instructions represented by the flowchart of FIGS. 4, 5, 6, 7 and/or 8. In particular, the FPGA 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the software represented by the flowcharts of FIGS. 4, 5 and/or 6. As such, the FPGA circuitry 1100 may be structured to effectively instantiate some or all of the machine readable instructions of the flowcharts of FIGS. 4, 5, 6, 7 and/or 8 as dedicated logic circuits to perform the operations corresponding to those software instructions in a dedicated manner analogous to an ASIC. Therefore, the FPGA circuitry 1100 may perform the operations corresponding to the some or all of the machine readable instructions of FIGS. 4, 5, 6, 7 and/or 8 faster than the general purpose microprocessor can execute the same.

In the example of FIG. 11, the FPGA circuitry 1100 is structured to be programmed (and/or reprogrammed one or more times) by an end user by a hardware description language (HDL) such as Verilog. The FPGA circuitry 1100 of FIG. 11, includes example input/output (I/O) circuitry 1102 to obtain and/or output data to/from example configuration circuitry 1104 and/or external hardware (e.g., external hardware circuitry) 1106. For example, the configuration circuitry 1104 may implement interface circuitry that may obtain machine readable instructions to configure the FPGA circuitry 1100, or portion(s) thereof. In some such examples, the configuration circuitry 1104 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1106 may implement the microprocessor 1000 of FIG. 10. The FPGA circuitry 1100 also includes an array of example logic gate circuitry 1108, a plurality of example configurable interconnections 1110, and example storage circuitry 1112. The logic gate circuitry 1108 and interconnections 1110 are configurable to instantiate one or more operations that may correspond to at least some of the machine readable instructions of FIGS. 4, 5, 6, 7 and/or 8, and/or other desired operations. The logic gate circuitry 1108 shown in FIG. 11 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations. The logic gate circuitry 1108 may include other electrical structures such as look-up tables (LUTs), registers (e.g., flip-flops or latches), multiplexers, etc.

The interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example Dedicated Operations Circuitry 1114. In this example, the Dedicated Operations Circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the processor circuitry 912 of FIG. 9, many other approaches are contemplated. For example, as mentioned above, modern FPGA circuitry may include an on-board CPU, such as one or more of the example CPU 1120 of FIG. 11. Therefore, the processor circuitry 912 of FIG. 9 may additionally be implemented by combining the example microprocessor 1000 of FIG. 10 and the example FPGA circuitry 1100 of FIG. 11. In some such hybrid examples, a first portion of the machine readable instructions represented by the flowcharts of FIGS. 4, 5, 6, 7 and/or 8 may be executed by one or more of the cores 1002 of FIG. 10 and a second portion of the machine readable instructions represented by the flowchart of FIGS. 4, 5, 6, 7 and/or 8 may be executed by the FPGA circuitry 1100 of FIG. 11.

In some examples, the processor circuitry 912 of FIG. 9 may be in one or more packages. For example, the processor circuitry 1000 of FIG. 10 and/or the FPGA circuitry 1100 of FIG. 11 may be in one or more packages. In some examples, an XPU may be implemented by the processor circuitry 912 of FIG. 9, which may be in one or more packages. For example, the XPU may include a CPU in one package, a DSP in another package, a GPU in yet another package, and an FPGA in still yet another package.

Figure 12:
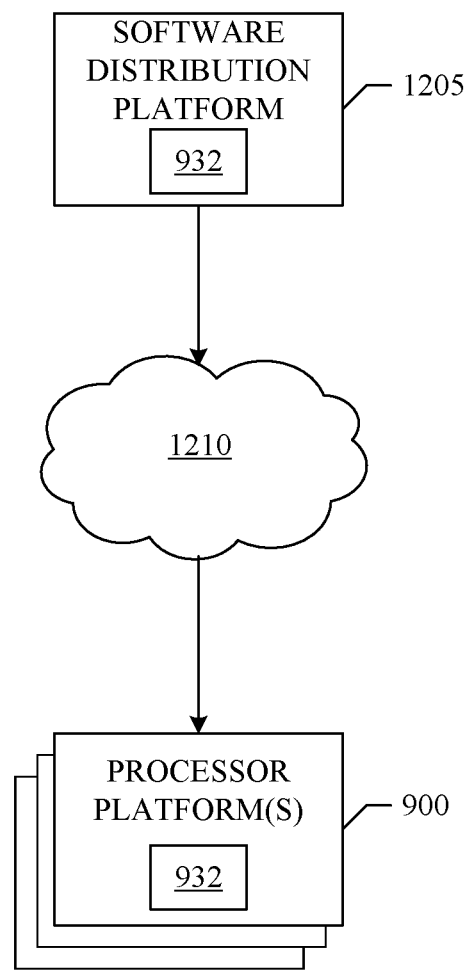
FIG. 12 is a block diagram of an example software distribution platform (e.g., one or more servers) to distribute software (e.g., software corresponding to the example machine readable instructions of FIGS. 4, 5, 6, 7 and/or 8) to client devices associated with end users and/or consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1205 to distribute software such as the example machine readable instructions 932 of FIG. 9 to hardware devices owned and/or operated by third parties is illustrated in FIG. 12. The example software distribution platform 1205 may be implemented by any computer server, data facility, cloud service, etc., capable of storing and transmitting software to other computing devices. The third parties may be customers of the entity owning and/or operating the software distribution platform 1205. For example, the entity that owns and/or operates the software distribution platform 1205 may be a developer, a seller, and/or a licensor of software such as the example machine readable instructions 932 of FIG. 9. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the machine readable instructions 932, which may correspond to the example machine readable instructions of FIGS. 4, 5, 6, 7 and/or 8, as described above. The one or more servers of the example software distribution platform 1205 are in communication with a network 1210, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 932 from the software distribution platform 1205. For example, the software, which may correspond to the example machine readable instructions of FIGS. 4, 5, 6, 7 and/or 8, may be downloaded to the example processor platform 900, which is to execute the machine readable instructions 932 to implement the example population reach determination circuitry 120. In some examples, one or more servers of the software distribution platform 1205 periodically offer, transmit, and/or force updates to the software (e.g., the example machine readable instructions 932 of FIG. 9) to ensure improvements, patches, updates, etc., are distributed and applied to the software at the end user devices.

From the foregoing, it will be appreciated that example systems, methods, apparatus, and articles of manufacture have been disclosed that estimate and use nested merge ratios for audience measurement. The disclosed systems, methods, apparatus, and articles of manufacture improve the efficiency of using a computing device by estimating merge ratios and using the merge ratios to determine de-duplicated population reach values in a manner that satisfies logical constraints, thereby preventing the output of impossible reach values. By preventing the output of impossible reach values, the disclosed systems, methods, apparatus, and articles of manufacture can prevent downstream processing systems from crashing or performing error handling that may result from impossible reach values being input to those downstream processing systems. The disclosed systems, methods, apparatus, and articles of manufacture are accordingly directed to one or more improvement(s) in the operation of a machine such as a computer or other electronic and/or mechanical device.

Further examples and combinations thereof include the following:

Example 1 includes an apparatus comprising at least one memory, machine readable instructions, and processor circuitry to execute the machine readable instructions to at least identify a first merged media event for which a first census audience value is to be determined, the first merged media event based on a union including a second merged media event, determine whether the first merged media event satisfies a mutual exclusivity condition, and in response to the first merged media event satisfying the mutual exclusivity condition, estimate the first census audience value for the first merged media event based on at least a merge ratio and a second census audience value previously estimated for the second merged media event.

Example 2 includes the apparatus of example 1, wherein the merge ratio is based on a first panel audience value obtained for the first merged media event and a plurality of panel audience values obtained for media events included in the union, the plurality of panel audience values including a second panel audience value obtained for the second merged media event.

Example 3 includes the apparatus of example 2, wherein the merge ratio is further based on a universe estimate obtained for a panel associated with the first panel audience value and the plurality of panel audience values.

Example 4 includes the apparatus of example 3, wherein the processor circuitry is to determine a lower bound and an upper bound for the first panel audience value based on the plurality of panel audience values and the universe estimate, and determine the merge ratio based on the first panel audience value, the lower bound and the upper bound.

Example 5 includes the apparatus of example 4, wherein the processor circuitry is to divide a first difference between the first panel audience value and the lower bound by a second difference between the upper bound and the lower bound to determine the merge ratio.

Example 6 includes the apparatus of example 1, wherein the union further includes a third individual media event, and the processor circuitry is to estimate the first census audience value for the first merged media event based on at least the merge ratio, the second census audience value previously estimated for the second merged media event, a third census audience value obtained for the third individual media event, and a universe estimate obtained for a population associated with the third census audience value.

Example 7 includes the apparatus of example 6, wherein the processor circuitry is to determine a lower bound and an upper bound for the first census audience value based on the second census audience value previously estimated for the second merged media event, the third census audience value obtained for the third individual media event, and the universe estimate, and add the lower bound to a product of the merge ratio and a difference between the upper bound and the lower bound to estimate the first census audience value.

Example 8 includes the apparatus of example 1, wherein the processor circuitry is to output at least one of an instruction or a signal to an audience measurement system in response to the first merged media event not satisfying the mutual exclusivity condition, the at least one of the instruction or the signal to cause the audience measurement system to at least one or halt or skip audience measurement processing associated with the first merged media event.

Example 9 includes at least one non-transitory computer readable medium comprising computer readable instructions that, when executed, cause one or more processors to at least identify a first merged media event for which a first census audience value is to be determined, the first merged media event based on a union including a second merged media event, determine whether the first merged media event satisfies a mutual exclusivity condition, and in response to the first merged media event satisfying the mutual exclusivity condition, estimate the first census audience value for the first merged media event based on at least a merge ratio and a second census audience value previously estimated for the second merged media event.

Example 10 includes the at least one non-transitory computer readable medium of example 9, wherein the merge ratio is based on a first panel audience value obtained for the first merged media event and a plurality of panel audience values obtained for media events included in the union, the plurality of panel audience values including a second panel audience value obtained for the second merged media event.

Example 11 includes the at least one non-transitory computer readable medium of example 10, wherein the merge ratio is further based on a universe estimate obtained for a panel associated with the first panel audience value and the plurality of panel audience values.

Example 12 includes the at least one non-transitory computer readable medium of example 11, wherein the instructions are to cause the one or more processors to determine a lower bound and an upper bound for the first panel audience value based on the plurality of panel audience values and the universe estimate, and determine the merge ratio based on the first panel audience value, the lower bound and the upper bound.

Example 13 includes the at least one non-transitory computer readable medium of example 12, wherein the instructions are to cause the one or more processors to divide a first difference between the first panel audience value and the lower bound by a second difference between the upper bound and the lower bound to determine the merge ratio.

Example 14 includes the at least one non-transitory computer readable medium of example 9, wherein the union further includes a third individual media event, and the instructions are to cause the in or more processors to estimate the first census audience value for the first merged media event based on at least the merge ratio, the second census audience value previously estimated for the second merged media event, a third census audience value obtained for the third individual media event, and a universe estimate obtained for a population associated with the third census audience value.

Example 15 includes the at least one non-transitory computer readable medium of example 14, wherein the instructions are to cause the one or more processors to determine a lower bound and an upper bound for the first census audience value based on the second census audience value previously estimated for the second merged media event, the third census audience value obtained for the third individual media event, and the universe estimate, and add the lower bound to a product of the merge ratio and a difference between the upper bound and the lower bound to estimate the first census audience value.

Example 16 includes the at least one non-transitory computer readable medium of example 9, wherein the instructions include first instructions that are to cause the one or more processors to output at least one of a second instruction or a signal to an audience measurement system in response to the first merged media event not satisfying the mutual exclusivity condition, the at least one of the second instruction or the signal to cause the audience measurement system to at least one or halt or skip audience measurement processing associated with the first merged media event.

Example 17 includes a method comprising identifying a first merged media event for which a first census audience value is to be determined, the first merged media event based on a union including a second merged media event, determining, by executing an instruction with at least one processor, whether the first merged media event satisfies a mutual exclusivity condition, and in response to the first merged media event satisfying the mutual exclusivity condition, estimating, by executing an instruction with the at least one processor, the first census audience value for the first merged media event based on at least a merge ratio and a second census audience value previously estimated for the second merged media event.

Example 18 includes the method of example 17, wherein the merge ratio is based on a first panel audience value obtained for the first merged media event and a plurality of panel audience values obtained for media events included in the union, the plurality of panel audience values including a second panel audience value obtained for the second merged media event.

Example 19 includes the method of example 18, wherein the merge ratio is further based on a universe estimate obtained for a panel associated with the first panel audience value and the plurality of panel audience values.

Example 20 includes the method of example 19, further including determining a lower bound and an upper bound for the first panel audience value based on the plurality of panel audience values and the universe estimate, and determining the merge ratio based on the first panel audience value, the lower bound and the upper bound.

Example 21 includes the method of example 20, wherein the determining of the merge ratio includes dividing a first difference between the first panel audience value and the lower bound by a second difference between the upper bound and the lower bound to determine the merge ratio.

Example 22 includes the method of example 17, wherein the union further includes a third individual media event, and the estimating of the first census audience value for the first merged media event is based on at least the merge ratio, the second census audience value previously estimated for the second merged media event, a third census audience value obtained for the third individual media event, and a universe estimate obtained for a population associated with the third census audience value.

Example 23 includes the method of example 22, further the estimating of the first census audience value includes determining a lower bound and an upper bound for the first census audience value based on the second census audience value previously estimated for the second merged media event, the third census audience value obtained for the third individual media event, and the universe estimate, and adding the lower bound to a product of the merge ratio and a difference between the upper bound and the lower bound to estimate the first census audience value.

Example 24 includes the method of example 17, further including outputting at least one of an instruction or a signal to an audience measurement system in response to the first merged media event not satisfying the mutual exclusivity condition, the at least one of the instruction or the signal to cause the audience measurement system to at least one or halt or skip audience measurement processing associated with the first merged media event.

Although certain example systems, methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An audience measurement system comprising a processor and a memory, the audience measurement system configured to perform a set of operations comprising:
   receiving, from a plurality of meters via a network, metering data for a plurality of media events;
   storing the metering data in a datastore managed by an audience measurement entity;
   obtaining, from one or more service providers, return path data for the plurality of media events;
   identifying a first merged media event for which a first deduplicated reach value is to be determined, the first merged media event based on a union including a second merged media event;
   determining whether the first merged media event satisfies a mutual exclusivity condition;
   in response to the first merged media event satisfying the mutual exclusivity condition, estimating the first deduplicated reach value for the first merged media event based on at least a merge ratio and a second deduplicated reach value previously estimated for the second merged media event, wherein the estimating is carried out in a manner that satisfies logical constraints on the first deduplicated reach value, and wherein the logical constraints are derived from a union inequality; and outputting the first deduplicated reach value.

2. The audience measurement system of claim 1, wherein the merge ratio is based on a first panel audience value obtained for the first merged media event and a plurality of panel audience values obtained for media events included in the union, the plurality of panel audience values including a second panel audience value obtained for the second merged media event.

3. The audience measurement system of claim 2, wherein the merge ratio is further based on a universe estimate obtained for a panel associated with the first panel audience value and the plurality of panel audience values.

4. The audience measurement system of claim 3, wherein the set of operations further comprises:
determining a lower bound and an upper bound for the first panel audience value based on the plurality of panel audience values and the universe estimate; and
determining the merge ratio based on the first panel audience value, the lower bound and the upper bound.

5. The audience measurement system of claim 4, wherein the set of operations further comprises dividing a first difference between the first panel audience value and the lower bound by a second difference between the upper bound and the lower bound to determine the merge ratio.

6. The audience measurement system of claim 1, wherein the union further includes a third individual media event, and the set of operations further comprises estimating the first deduplicated reach value for the first merged media event based on at least the merge ratio, the second deduplicated reach value previously estimated for the second merged media event, a third deduplicated reach value obtained for the third individual media event, and a universe estimate obtained for a population associated with the third deduplicated reach value.

7. The audience measurement system of claim 6, wherein the set of operations further comprises:
determining a lower bound and an upper bound for the first deduplicated reach value based on the second deduplicated reach value previously estimated for the second merged media event, the third deduplicated reach value obtained for the third individual media event, and the universe estimate; and
adding the lower bound to a product of the merge ratio and a difference between the upper bound and the lower bound to estimate the first deduplicated reach value.

8. The audience measurement system of claim 1, wherein the set of operations further comprises outputting at least one of an instruction or a signal in response to the first merged media event not satisfying the mutual exclusivity condition, the at least one of the instruction or the signal to cause the audience measurement system to at least one of halt or skip audience measurement processing associated with the first merged media event.

9. A non-transitory computer readable medium comprising computer readable instructions that, when executed, cause one or more processors to at least:
receive, from a plurality of meters via a network, metering data for a plurality of media events;
store the metering data in a datastore managed by an audience measurement entity;
obtain, from one or more service providers, return path data for the plurality of media events;
identify a first merged media event for which a first deduplicated reach is to be determined, the first merged media event based on a union including a second merged media event;
determine whether the first merged media event satisfies a mutual exclusivity condition;
in response to the first merged media event satisfying the mutual exclusivity condition, estimate the first deduplicated reach value for the first merged media event based on at least a merge ratio and a second deduplicated reach value previously estimated for the second merged media event, wherein the estimating is carried out in a manner that satisfies logical constraints on the first deduplicated reach value, and wherein the logical constraints are derived from a union inequality; and
output the first deduplicated reach value.

10. The non-transitory computer readable medium of claim 9, wherein the merge ratio is based on a first panel audience value obtained for the first merged media event and a plurality of panel audience values obtained for media events included in the union, the plurality of panel audience values including a second panel audience value obtained for the second merged media event.

11. The non-transitory computer readable medium of claim 10, wherein the merge ratio is further based on a universe estimate obtained for a panel associated with the first panel audience value and the plurality of panel audience values.

12. The non-transitory computer readable medium of claim 11, wherein the instructions are to cause the one or more processors to:
determine a lower bound and an upper bound for the first panel audience value based on the plurality of panel audience values and the universe estimate; and
determine the merge ratio based on the first panel audience value, the lower bound and the upper bound.

13. The non-transitory computer readable medium of claim 12, wherein the instructions are to cause the one or more processors to divide a first difference between the first panel audience value and the lower bound by a second difference between the upper bound and the lower bound to determine the merge ratio.

14. The non-transitory computer readable medium of claim 9, wherein the union further includes a third individual media event, and the instructions are to cause the one or more processors to estimate the first deduplicated reach value for the first merged media event based on at least the merge ratio, the second deduplicated reach value previously estimated for the second merged media event, a third deduplicated reach value obtained for the third individual media event, and a universe estimate obtained for a population associated with the third deduplicated reach value.

15. The non-transitory computer readable medium of claim 14, wherein the instructions are to cause the one or more processors to:
determine a lower bound and an upper bound for the first deduplicated reach value based on the second deduplicated reach value previously estimated for the second merged media event, the third deduplicated reach value obtained for the third individual media event, and the universe estimate; and
add the lower bound to a product of the merge ratio and a difference between the upper bound and the lower bound to estimate the first deduplicated reach value.

16. The non-transitory computer readable medium of claim 9, wherein the instructions include first instructions that are to cause the one or more processors to output at least one of a second instruction or a signal to an audience measurement system in response to the first merged media event not satisfying the mutual exclusivity condition, the at least one of the second instruction or the signal to cause the audience measurement system to at least one of halt or skip audience measurement processing associated with the first merged media event.

17. A method comprising:
  receiving, from a plurality of meters via a network, metering data for a plurality of media events;
  storing the metering data in a datastore managed by an audience measurement entity;
  obtaining, from one or more service providers, return path data for the plurality of media events;
  identifying a first merged media event for which a first deduplicated reach value is to be determined, the first merged media event based on a union including a second merged media event;
  determining, by executing an instruction with at least one processor, whether the first merged media event satisfies a mutual exclusivity condition; and
  in response to the first merged media event satisfying the mutual exclusivity condition, estimating, by executing an instruction with the at least one processor, the first deduplicated reach value for the first merged media event based on at least a merge ratio and a second deduplicated reach value previously estimated for the second merged media event, wherein the estimating is carried out in a manner that satisfies logical constraints on the first deduplicated reach value, and wherein the logical constraints are derived from a union inequality; and
  outputting the first deduplicated reach value.

18. The method of claim 17, wherein the merge ratio is based on a first panel audience value obtained for the first merged media event and a plurality of panel audience values obtained for media events included in the union, the plurality of panel audience values including a second panel audience value obtained for the second merged media event.

19. The method of claim 18, wherein the merge ratio is further based on a universe estimate obtained for a panel associated with the first panel audience value and the plurality of panel audience values.

20. The method of claim 19, further including:
  determining a lower bound and an upper bound for the first panel audience value based on the plurality of panel audience values and the universe estimate; and
  determining the merge ratio based on the first panel audience value, the lower bound and the upper bound.

* * * * *